(12) United States Patent
St. Martin et al.

(10) Patent No.: US 12,430,345 B2
(45) Date of Patent: Sep. 30, 2025

(54) AGGREGATION OF GLOBAL STORY BASED ON ANALYZED DATA

(71) Applicant: INVISIBLE HOLDINGS LLC, Sheridan, WY (US)

(72) Inventors: Raymond Francis St. Martin, Felton, CA (US); Andrew Lee Van Valer, Reno, NV (US); John Cronin, Sheridan, WY (US); Seth Cronin, Sheridan, WY (US); Michael Baker, Sheridan, WA (US)

(73) Assignee: INVISIBLE HOLDINGS LLC, Sheridan, WY (US)

( * ) Notice: Subject to any disclaimer, the term of this patent is extended or adjusted under 35 U.S.C. 154(b) by 0 days.

(21) Appl. No.: 18/647,332

(22) Filed: Apr. 26, 2024

(65) Prior Publication Data

US 2024/0362236 A1 Oct. 31, 2024

Related U.S. Application Data

(60) Provisional application No. 63/462,118, filed on Apr. 26, 2023, provisional application No. 63/462,121, filed on Apr. 26, 2023, provisional application No. 63/608,589, filed on Dec. 11, 2023.

(51) Int. Cl.
*G06F 16/2457* (2019.01)
*G06F 16/9536* (2019.01)

(52) U.S. Cl.
CPC .... *G06F 16/24578* (2019.01); *G06F 16/9536* (2019.01)

(58) Field of Classification Search
CPC ............ G06F 16/24578; G06F 16/9535
See application file for complete search history.

(56) References Cited

U.S. PATENT DOCUMENTS

| | | | |
|---|---|---|---|
| 9,026,856 B2* | 5/2015 | Hecox | G06F 11/0706 714/38.1 |
| 9,984,229 B1* | 5/2018 | Easttom, II | G06F 21/51 |
| 10,083,239 B2* | 9/2018 | Yung | G06F 16/9538 |
| 10,666,529 B2* | 5/2020 | Lundberg | H04L 43/08 |
| 11,672,360 B2* | 6/2023 | Day | B65D 43/0208 206/315.9 |
| 2009/0309352 A1* | 12/2009 | Walker | G07F 17/329 29/527.2 |
| 2016/0034467 A1* | 2/2016 | Churi | G06Q 30/02 707/748 |
| 2017/0026683 A1* | 1/2017 | Joao | H04N 21/2668 |

(Continued)

FOREIGN PATENT DOCUMENTS

WO WO 2024/0227198 10/2024

OTHER PUBLICATIONS

PCT Application No. PCT/US2024/028601, International Search Report and Written Opinion dated Aug. 15, 2024.

*Primary Examiner* — Etienne P Leroux
(74) *Attorney, Agent, or Firm* — Polsinelli LLP

(57) ABSTRACT

Data regarding a subject is received over a communication network. The data is parsed to extract data elements that are associated with various aspects of the subject. A plurality of sub-scores is calculated based on the values associated with the data elements. A combined score is calculated based on the plurality of sub-scores and weights corresponding to the plurality of sub-scores. An indication of the combined score associated with the subject is output.

26 Claims, 13 Drawing Sheets

(56) References Cited

U.S. PATENT DOCUMENTS

| | | | |
|---|---|---|---|
| 2017/0031915 A1* | 2/2017 | Moxon | H04L 67/306 |
| 2017/0139921 A1 | 5/2017 | Ball et al. | |
| 2017/0316181 A1 | 11/2017 | Kass-Hout et al. | |
| 2018/0121263 A9 | 5/2018 | Li et al. | |
| 2019/0095500 A1* | 3/2019 | Pandey | G06F 16/288 |
| 2020/0202071 A1 | 6/2020 | Ghulati | |
| 2020/0372018 A1 | 11/2020 | Gross | |
| 2021/0049217 A1* | 2/2021 | Ogawa | G06N 5/04 |
| 2021/0064854 A1* | 3/2021 | Chen | G06Q 20/40 |
| 2021/0217081 A1* | 7/2021 | Ravi | G06F 16/24578 |
| 2021/0349977 A1* | 11/2021 | Kishikawa | G06F 21/55 |
| 2022/0329592 A1* | 10/2022 | Koeten | H04L 9/0637 |
| 2022/0365938 A1* | 11/2022 | Poh | G06F 16/24578 |
| 2023/0267031 A1* | 8/2023 | Lozano | G06N 20/20 |
| | | | 714/37 |

\* cited by examiner

AGGREGATION OF GLOBAL STORY BASED ON ANALYZED DATA

CROSS-REFERENCE TO RELATED APPLICATIONS

The present application claims the priority benefit of U.S. Provisional Patent Application No. 63/462,118 filed on Apr. 26, 2023, entitled "Object Corroboration and Story Verification System," U.S. Provisional Patent Application No. 63/462,121 filed on Apr. 26, 2023, entitled "Aggregating Global Human History," and U.S. Provisional Patent Application No. 63/608,589 filed on Dec. 11, 2023, entitled "Aggregating Global Human Story," the disclosures of which are all incorporated herein by reference in their entirety.

FIELD OF THE DISCLOSURE

The present disclosure is generally related to data aggregation, particularly relating to identifying, relating, scoring, and aggregating physical and virtual objects and stories based upon a plurality of data sources and types.

BACKGROUND

When researching for a person, place, event, or thing from the past or the present, it is difficult to aggregate and reconcile the different versions of history especially when combining different sources and when considering objects; their ownership, multiple values and their histories. Each story, mention or account can have its own perspective, attribution, interpretation, and/or sourced materials and sources. In some cases, as the number of varying accounts increase, each account can become more suspect in its perceived accuracy. Therefore, it is desirable to find a way to consolidate this information in search of accuracy and comprehensive understanding.

Aggregating unique object or collection data in a manner that it can be searchable and presented to a user in a coherent and usable format can be difficult, particularly as the volume of data increases. Parsing through search results can be inefficient and relevant results can be easily overlooked. It is also common for unrelated results to be included in search results. Therefore, a method of returning specific and relevant object data through the composition of a continuous historical account or global story is desired.

SUMMARY

Examples of the present technology include a method, a system, and a non-transitory computer readable storage medium for assembling data. Data regarding a subject is received over a communication network or through a private connection. The data is parsed to extract data elements that are associated with various aspects of the subject. These data elements can include individuals or a collection of names of people, places or things, as well as event, time or space data. A plurality of relationships and subscores are associated and calculated based on the objects and values associated with the data elements. When calculating various values, combined scores are calculated based on the plurality of subscores and weights corresponding to the plurality of subscores. An indication of the combined scores and subscores associated with the subject, as well as its relationships to subjects, geographies and events is outputted.

DETAILED DESCRIPTION

Figure 1:
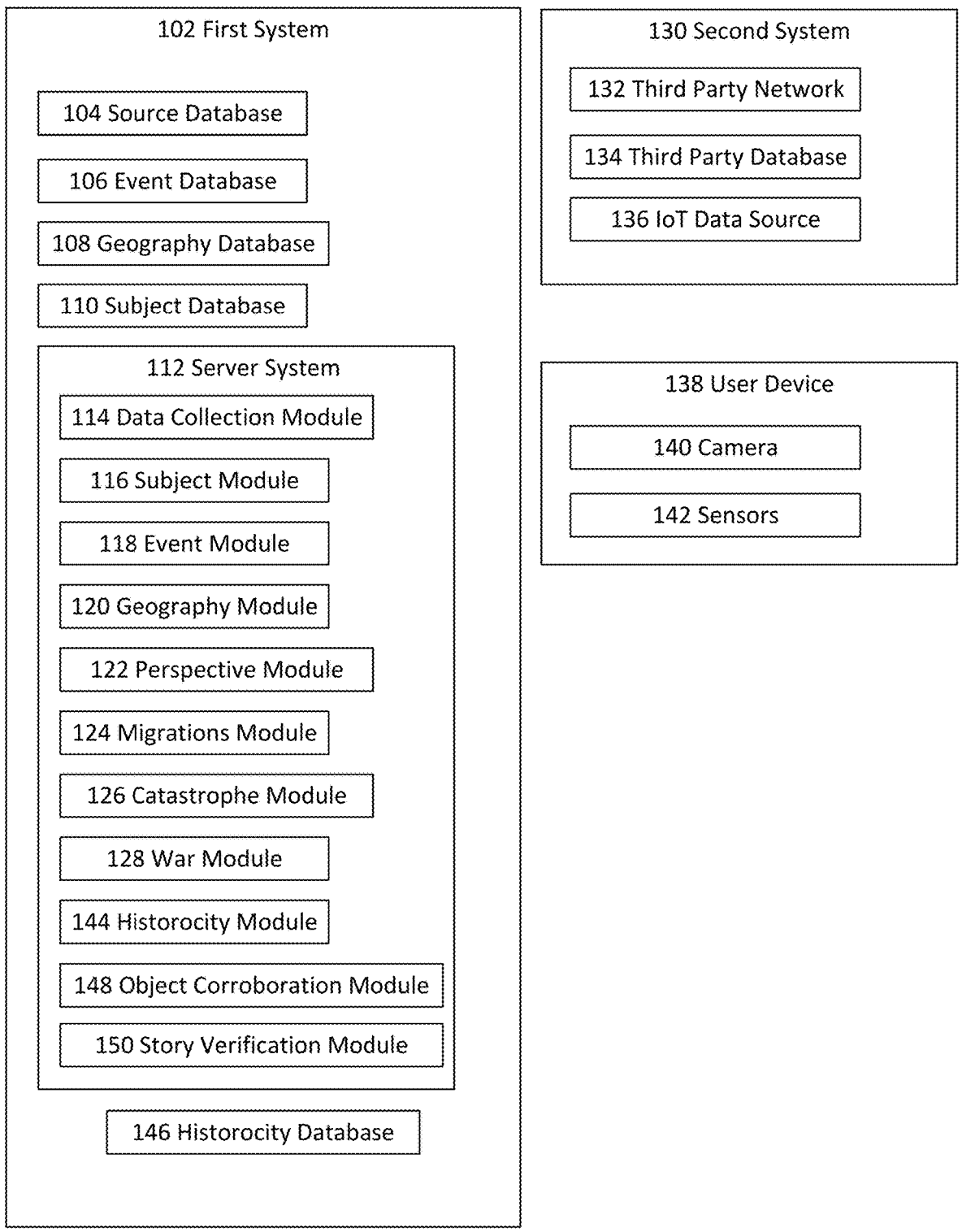
FIG. 1 is a block diagram illustrating an architecture of a story aggregation system, according to some examples.

Many of the embodiments described herein are described in terms of sequences of actions to be performed by, for example, elements of a computing device. It should be recognized by those skilled in the art that specific circuits can perform the various sequence of actions described herein (e.g., application-specific integrated circuits (ASICs)) and/or by program instructions executed by at least one processor. Additionally, the sequence of actions described herein can be embodied entirely within any form of computer-readable storage medium such that execution of the sequence of actions enables the processor to perform the functionality described herein. Thus, the various aspects of the present technology may be embodied in several different forms, all of which have been contemplated to be within the scope of the claimed subject matter. In addition, for each of the embodiments described herein, the corresponding form of any such embodiments may be described herein as, for example, a computer configured to perform the described action.

Physical, digital representations, and digitally native objects have origin stories and narratives, having either been made by someone, something, some event, somewhere, at some time—all have provenance, history and a story to tell. Objects associated and connected with relevant information are a method of articulating and communicating ideas, information, art, culture, music, sports, and literature, including various subject matter areas.

In some examples, virtual objects, referred to herein also as data elements, can provide details about various properties of an object, subjects and/or events and/or people related to the object, and so forth. An object boundary may change over time, but it has a visible, machine readable, human comprehensible or tangible surface and specific properties. The aggregation of data from a plurality of sources may facilitate the creation of a narrative, story or timeline of events which may document such changes.

For example, a ball is spherical. However, the sphere may have unique properties (i.e., a tennis ball is fuzzy, a marble is smooth, a golf ball has surface dimples, etc.). Therefore, the form of a sphere may have infinite properties attached to it. Therefore, an object has an identity that may change over time, with changes capable of being tracked and annotated in real-time. The initial object identity may change based on outside physical forces or input but can also be augmented and amplified by information associated with the object itself. Such properties may be provided from a plurality of sources which may then be associated with similar accounts to create a more complete collection of properties describing the object. Such properties, the outside physical forces or inputs, and/or other information about the ball may be examples of data elements about a subject (the ball).

Data elements and objects can be enhanced by using a Social Identity of Objects (SIO) system, which may be implemented using the systems and methods discussed herein.

An SIO system, and its technical framework of data and information, seamlessly associate all relevant information about a specific object and provide an increasingly valuable currency as a repository, sharing, and exchange platform. Embodiments of the SIO system may comprise the aggregation of a plurality of data sources and types of data to create a cohesive narrative, story, timeline, view of relationships, or account of an object or collection of objects. An aggregation of data related to a person, place, and/or event from a plurality of sources may provide a more complete description of said person, place, and/or event, including context which might otherwise be overlooked or missing.

The systems and methods discussed herein are associated with processes of discovering objects through a system of relationships, attributes, and context of specific objects. Searches can be made in various ways and can be associated with a single type or choice of the different types of searches outlined hereafter in this document. The searches can be made based on any attributes or relationships of the SIOs within a single database or group of public or private databases.

Search examples might include color, size, date, retailer, container size, and relationships to other systems connecting associations or attributes attached with each type of registered or non-registered user by a menu or general search driven by choices.

Individual users can deploy unique search criteria based on their specific requirements. For example, a consumer might wish to see the complete narrative history of an object or product in any possible views-limited, for instance, to publicly available information only. Conversely, an individual might wish to explore the history of an object (e.g., sporting memorabilia) through associated narratives or stories and recollections via a network of private databases.

A manufacturer might choose to see the totality of details and attributes of all component materials, transportation, and pricing from the time of product inception, which may be aggregated into a narrative or story. A pharmaceutical distributor might choose to access an entire product's lifecycle, including effects on the SIO such as feelings, returns, side effects, and/or propensity to re-purchase.

Examples of the present technology may relate to information as elements of a story or a story itself which may be an aggregation of information. When information is entered into and stored in an electronic database, it is generally referred to as data. In one embodiment, this technology can integrate multiple data types, determine quality of the data, and format the data.

For example, using the systems and methods discussed herein, a system can utilize various data search view techniques in its system framework to access data and transform it into usable information. These include a holistic or comprehensive view, which refers to the complete data set "picture." This view looks at the data throughout its entire lifecycle—from the moment an object originates until the information is needed by an individual at the current moment of retrieval. An example of such a holistic view may outline a story, including data elements from multiple data sources, aggregated according to a common subject, theme, or query.

The holistic data approach is designed to improve data analysis and integration by enabling information to be distributed across multiple platforms and systems efficiently and consistently. The first component of the holistic data process includes data collection-assembling information from a variety of public and/or private sources. Data collection can be compiled and identified from structured, semi-structured, and unstructured sources, for example operational systems (i.e., CRM, financial systems), website information, on premise data, internet of things (IoT), artificial intelligence (AI), machine learning (ML) models, large language models (LLMs), social media, and user-supplied narratives and/or stories.

Third, presenting holistic data in a meaningful format(s) when requested, maintaining and supplementing data within a structural framework, increasing in value over time remains a source of evolving relevance to users. Presentation techniques can uncover key metrics, trends, multiple value types, and exceptions and offer customized and unique visualizations. Embodiments of the present technology may relate to the presentation of data in the form of a narrative or story. A story may include aggregation(s) of types of media or data, such as transcript(s), text, image(s), timeline(s), video(s), and/or audio.

Fourth, maintaining data quality and consistency is critical for the long-term viability of holistic data. An SIO system as discussed herein can deploy tactics including identifying data quality thresholds, fraud alerts, audit report functionality, and robust data governance protocols. In some examples, all SIO master data repositories and data privacy strategies are applied to all users. In embodiments, data quality may include a system and/or method of verifying the accuracy or truthfulness of data.

In some examples, the technologies discussed herein provide personalized experiences for the user, offering a revolutionary future for data visualization. Unlike systems in which questions are asked and answers are found, a humanistic view of data can be contextual and/or related to a specific object, circumstance, event, and/or relationship. Data views are transformed into visual representations, adding substance and context to the experience, for instance via creation of stories.

The SIO systems disclosed herein leverage information from people with a personal connection, or interest in specific objects, events, and/or cultures. An SIO system can implement a personalized approach to how data is captured, analyzed, and displayed, realizing that subjectivity and context can play a defining role in understanding objects, events, social changes, and culture. An SIO system can create personalized experiences, for instance for commercial and/or retail contexts. SIO systems analyze received data to understand the values and needs of people in the larger context of their lives (e.g., the aggregation of data forming a narrative or story).

In some examples, this technology can integrate and use chronological and/or historical data views and timelines. Chronological, historical, or timeline view data, broadly considered, is collected about past events and circumstances about a particular object, information set, or subject matter. Historical data includes most data generated manually or automatically and tracks data that changes or is added over time. Historical data offers a vast array of use possibilities relating to objects, narratives, cultural events, project and product documentation, conceptual, procedural, empirical, and/or objective information. Examples of the present technology relate to chronological data via improvements in the collection and aggregation of such data, including data that otherwise may not intuitively be associated with a chronological context and provide the data as a story, adding context to a chronology of events. Likewise, people, objects, etc. each have their own chronology which may be expanded upon with further context via the creation and evolution of a story.

With increased cloud computing and storage capacities, data collection and retrieval allow for more data stored for greater periods with access by more users. Since data storage does require resources and maintenance, data life cycle management (DLM) can ensure that rarely referenced data can be archived and accessed only when needed.

In some examples, this technology can integrate clustered view data. Data cluster view techniques are based on similarities among data points. Data clusters show which data points are closely related, so the data set can be structured, retrieved, analyzed, and understood more easily. Embodiments of the present technology may leverage data clustering to form association which may be used to aggregate data to form stories. Data clusters are a subset of a larger dataset in which each data point is closer to the cluster center than to other cluster centers in the dataset. Cluster "closeness" is determined by a process called cluster analysis. Data clusters can be complex or simple based on the number of variables in the group. Data clustering can be performed using a clustering algorithm, such as centroid-based clustering, distribution-based clustering, hierarchical clustering, K-means clustering, DB scan clustering, Gaussian mixture modeling, balance iterative reducing and clustering using hierarchies (BIRCH), affinity propagation clustering, means-shift clustering, ordering points to identify the clustering structure (OPTICS), agglomerative hierarchy clustering, or a combination thereof.

Clustered data sets occur in abundance because all the events we experience and that we might wish to identify, understand, associate with specific objects and act upon have measurable durations and locations. It, therefore, follows that the individual data points associated with each instance of such an event are clustered with respect to time and space. Many events associated with clustered data can be highly significant, and it is important to identify them as accurately as possible. Clustering is deployed for high-performance computing. Since related data is stored together, the related data can be accessed more efficiently. Cluster views deliver two advantages: efficiency of information retrieval and reducing the amount of space required for digital storage. Information related and frequently requested can be used for cluster viewed data requirements.

In some examples, the present technology can integrate multiple data visual formats. Data visualization is a methodology by which the data in raw format is portrayed to reveal a better understanding and provide a meaningful way of showcasing volumes of data and information. Various methods of data visualization and viewing options can be deployed for various purposes and information sets, including but not limited to: biological views, legacy views, historical view, object view, private view, shared view, public view, combined view, sentimental views, relational view, significance views, monetary/financial views, consumer views, supply chain views, and social views, and other views not yet imagined. For example, in supply chain, there is a need to create data visualizations that capture the connectedness of objects through time and space in relation to variables such as materials, timelines, locations on a map, companies and humans involved in the construction, consumption and delivery of such objects. The system may also be able to display the "story" that is created and understood when these elements are combined. In some examples, the system may display these objects as data as a user would see in a readout visualization, or data extraction interface. In another example, the data elements and their relationships may be shown as patterns or displayed, visualized as rich media in 3D, wearable, AR or VR systems and devices. In the case of VR wearables, such as the Apple Vision Pro, the data elements can be displayed on standalone screens or multiple versions of the data element's state spread across multiple screens or applications. It is also possible to merge, drag and drop objects or data elements into or onto multiple other objects or data elements and thereby combine their data into new objects, each new object with its own connections, relationships, ownership and attributions. In another example, the system may display a view that shows the layers of connectedness and relationships of objects in a grid or other rich digital media display. Embodiments of the present technology may relate to data visualizations as methods of presenting stories comprised of aggregated data or information to a user.

A clear understanding of the audience influences the visualization format types and creates a tangible connection with the viewer. Different data visualization formats and narratives may be different, and data visualization types may be customized based on goals, aims, objects, or topics. Examples of the present technology may relate to the audience as a perspective, or an element of the perspective which may influence or direct the information aggregated to create a story.

In some examples, this technology can integrate hierarchical database models, technologies, and processes. A hierarchical data view is defined as a set of data items related to each other by categorized relationships and linked to each other in parent-child relationships in an overall "family tree" structure. When information needs to be retrieved, the whole tree is scanned from the root node down. Modern databases have evolved to include the usage of multiple hierarchies over the same data for faster, easier searching and retrieval. Embodiments of the present technology may relate to hierarchical data by improvements in the methods of aggregating data to form stories which may be illustrated in a hierarchical form.

The hierarchical structure of data is important as the process of data input, processing, retrieval, and maintenance is an essential consideration. An example would include a catalog of products, each within specific categories. Categories could be high-level categories such as clothing, toys, appliances, and sporting goods-however, there may also contain subcategories within those: in clothing, there may be pants, jackets, shoes-toys might include board games, action figures, and dolls. Within subcategories, there may be even more categories and so on.

The hierarchical database model offers several advantages, including but not limited to the ability to easily add and delete new information, data at the top of the hierarchy being quickly accessible quickly via explicit table structures, efficiency for linear data storage applications, support for systems that work through a one-to-many relationship, efficiency in storage and retrieval for large data sets, improved data sharing, and a clear chain of authority and security.

In some examples, this technology can integrate spherical data views and data credibility control. A spherical data view is a form of non-linear data in which observational data are modeled by a non-linear combination model relying on one or more independent variables. Non-linear methods typically involve applying some type of transformation to the input dataset. After the transformation, many techniques can then try to use a linear method for classification.

Data credibility is a major focus implemented to ensure that databases function properly and return quality data and accurate information to the user. In some examples of an SIO system, a weighted average technique of ensuring data quality can be utilized and includes processing a collection of each of the data attributes such as location, type of device, history, individual, current, and past relationships with other SIOs and many others to determine the credibility of the SIO data. For example, a search for a product grown in a certain location by a specific farm might include information relating to climate, seed varietal, farm name, sustainable price, location, compliance with regulations, and organic certification. This process evaluates the average of a data set, recognizing (i.e., weighing) certain information as more important than others.

Verifying data integrity is an extremely important measure since it establishes a level of trust a user can assign to the information returned and presented. Credible data can be assured when robust data management and governance are incorporated into the system. Satisfying the requirements of intended users and associated applications improves the quality of the data by assuring the highest quality data is kept, including but not limited to accuracy from data input through data presentation, exceptional database design and definition to avoid duplicate data and source verification, data governance and control, accurate data modeling and auditing, enforcement of data integrity, integration of data lineage and traceability, quality assurance and control, or a combination thereof.

In some examples, this technology can integrate computer programming and blockchain technologies. A blockchain framework provides a unique data structure in the context of computer programming, consisting of a network of databases/virtual servers connected via many distinct user devices. Whenever a contributor in a blockchain adds data (i.e., a transaction, record, text, etc.), it creates a new "block," which is stored sequentially, thereby creating the "chain." Blockchain technology enables each device to verify every modification of the blockchain, becoming part of the database and creating an exceptionally strong verification process. Embodiments of the present technology may relate to blockchain frameworks wherein media, text, or unique identifiers may be stored as blocks within a blockchain, or a story or query used to generate a story, may comprise a block or series of blocks in a blockchain.

Security provided by this distributed ledger/data process is among the most powerful features of blockchain technology. Since each device holds a copy of these ledgers, the system is extremely difficult to hack-if an altered block is submitted on the chain, the hash or the keys along the chain are changed. The blockchain provides a secure environment for sharing data and is increasingly used in many industries, including finance, healthcare, and government.

Blockchain ledgers are typically divided into three distinct types and can be managed differently by the network participants. For instance, blockchain ledger implementations can include (1) public blockchain ledgers, (2) private blockchain ledgers, and (3) hybrid blockchain ledgers. Public blockchain ledgers are open to a wide range of users where anyone can join a network and are by design "decentralized systems" where participants can read, add entries, and participate in processes. Public blockchain systems are not controlled by any one party. Private blockchain implementations are open to a limited number of people, is typically used in a business environment where the content in the blockchain is not shared with the public and can be controlled by one or more parties. A hybrid blockchain implementation is a mixture of private and public blockchains that, in some examples, is not open to everyone but still offers data integrity, transparency, and security features that are important components of the technology. Blockchain technologies offer increased security and can accommodate highly scalable applications.

In some examples, this technology can integrate non-fungible tokens (NFT). Blockchain security and cryptographic protocols make this technology increasingly attractive for business models and applications where provenance and authenticity are critical. While blockchain is well-known for applications in the cryptocurrency world, it is becoming an essential component of applications for non-fungible tokens (NFT).

If something is fungible—it is interchangeable with an identical item—NFTs, on the other hand, are unique and non-interchangeable units of data stored on a blockchain-therefore, one NFT is not equal to another. The possibilities for NFTs within the blockchain framework are virtually endless because each NFT is unique yet can evolve over time. The value of NFTs is in their "uniqueness" and ability to represent physical objects in the digital world. Embodiments of the present technology may relate to NFTs such that a story may be an NFT.

Once an NFT is created, it is assigned a unique identifier on the chain it is created on that assures authenticity and originality on that blockchain. Each NFT is unique on the chain it is minted on, so all the information about the token is stored on the instantiated "mined on" blockchain-meaning if one "block" in the chain fails, information still exists on another block, ensuring the NFT remains safe and secure indefinitely.

The unique capabilities of blockchain technology coupled with NFTs guarantee the authenticity, originality, and longevity of objects, artwork, cultural items, and music tracks, among a host of other categories. With blockchain technology, it is impossible to copy or reproduce an NFT, ownership can recorded unalterably (or a way in which alteration(s) are detectable).

Tracking and exchanging real-world assets in the blockchain can assure that the asset has not been duplicated or fraudulently altered. NFTs are not limited to purely digital items, but digital versions of objects from the physical world can be attached to specific narratives and stories. Unlike digital media, represented by codes and numbers-physical objects are separate entities that can carry intuitive connections.

An innovative example of this technology is occurring in cultural heritage preservation. Collecting and preserving cultural heritage data, objects, and associated narratives allow communities to interact with historical and culturally relevant artifacts and objects in unique and novel ways. These objects communicate with the viewer through the memories we associate with them. Global historical events and objects are inextricably linked to personal histories. Embodiments of the present technology relate to cultural heritage preservation by improving the aggregation of data from a plurality of data sources relating to artifacts and accounts to form stories with improved context. The context may further be improved using systems and methods to quantify and account for the reliability, accuracy, and truthfulness of data and data sources.

Internet connectivity allows "connected objects" to be more useful and interactive in conjunction with the use of enhanced programming platforms, sensors, AI, Augmented reality, intuitive applications. The power to connect stories and narratives with objects, and share the resulting combination, helps share information and stories efficiently and flexibly.

"Historocity" or "historacity," as defined herein, is a specialized metric designed to quantify the aggregated historical value of an artifact, or a collection thereof. Unlike the traditional concept of historicity, which is limited to the verification and authentication of historical events, characters, or phenomena, historocity expands the scope to include three additional dimensions: popularity, trust or certification, and historical value associated with objects. Popularity is measured by the level of public attention an artifact or its associated elements have garnered over time, through public mentions, scholarly references, or social interactions. Trust or certification quantifies the level of confidence in the provenance or authenticity of the artifact, established through expert opinions, credentials, or documented evidence. The value associated with objects allows for comparison of other similar objects across many domains, monetary value being the most obvious. For example, two nearly identical baseballs may sell for entirely different orders of magnitude based on the stories told about them, e.g., a slightly used baseball may sell at a yard sale for $2 after a member of the household has lost interest in the sport, compared to Mark McGwire's No. 70 in 1998 baseball, which sold for $3 million. The calculation of Historocity integrates these multidimensional data points to produce a composite value that can be represented numerically or categorically. In some instances, this value is further refined by integrating social or sentimental factors, yielding an even more comprehensive value termed "aggregated historocity" or combined historocity. This aggregated value not only serves as a holistic measure of the artifact's historical significance but also holds transactional utility. It can be sold, transferred, willed, or loaned either independently of the physical artifact or in conjunction with it. Historocity provides a robust framework for evaluating the comprehensive historical significance of artifacts and collections, offering utility for curators, researchers, and collectors alike.

The SIO and their associated historocity scoring system presents a novel method of determining an object's significance based on a combination of various value systems such as social and relationship values, historical values, sentimental value, spiritual value, environmental values, educational value, and many other as of yet defined derivative values. By integrating these multifaceted value systems into the historocity scoring, the Social Identity of Objects offers a comprehensive, nuanced, and culturally sensitive method to ascertain an object's importance in a given context.

To further expand on the historocity scoring system in the SIO, other value systems may be considered. Incorporation of emotional value addresses the complex spectrum of human feelings attached to objects or experiences. This encompasses not only positive sentiments like joy and nostalgia but also accounts for potential negative associations. Understanding that our connections with items aren't merely functional but deeply emotional provides a holistic view of an object's significance. Location value accentuates the importance of geographical positioning in determining an object's relevance. Economic and social attributes of a location, combined with factors like access to essential amenities and safety, play a pivotal role in an object's value. This dimension not only provides context but also highlights the dynamic interplay of market forces and socio-economic conditions in shaping perceptions of value. Intrinsic value incorporates a philosophical perspective of the value of an object, emphasizing the inherent worth of an object or entity, irrespective of its market-driven or functional value. Spatial value can be considered in terms of, for example, urban planning and architecture, stressing the value derived from specific spatial contexts, e.g., a certain amount of square or cubic footage may have some value regardless of (or despite) its contents. Physical value may be tangible metrics on the material properties and performance capabilities of objects.

The historocity scoring system for SIO management may further incorporate or reflect upon various additional value paradigms, including Fiat value, the cryptocurrency value, the intellectual value, moral value, cultural value, regional value, human value, social justice, and overall well-being. Such a system promotes respect, autonomy, sustainability value business value economic value, self-value, instrumental value, and health value.

In an SIO network, a historocity scoring system is introduced to facilitate the exploration and ranking of individual objects and collections. The system computes relative scoring metrics based on multiple value systems, both mentioned and unmentioned. Users can evaluate and order objects or collections in accordance with these metrics, providing flexibility to accommodate any past, present, or future value system for comprehensive object assessment.

FIG. 1 is a block diagram illustrating an architecture of a story aggregation system, according to some examples. The story aggregation system is a system that can organize and manage a large amount of content related to stories. The system consists of building blocks, which are objects with rich data attributes such as events, characters, relationships, locations, organizations, etc. These objects can be created and edited by users or automatically by modules. The system also includes references to source materials or source files stored in a source database, which may be, for example, such as news articles, social media posts, digital or physical archives, or academic papers, etc. These sources are used to create and support the building blocks, allowing users to reference the original source file and information originated and how it is continuously related to other objects.

This system comprises a first system 102 that may collect, create, and store a social identities of objects identity and code for instantiated and parsed objects (e.g., SIOs). The first system 102 enables instantiation of SIO data for each object in the system, and associates and recommends data based on time, place, space, locations, geography, relationships, written tags, photos, videos, descriptions, commonality, defining and structural metadata, and emotions to be displayed through an interface, among other defining attributes and functions. The first system 102 may further be used to assess and verify the accuracy of an object or stories which may be comprised of one or more objects. Truth may be based upon verifiable facts, or by corroborating one or more objects with one or more similar or verifiable accounts. For example, a plurality of accounts may describe the series of events during a baseball game. While the perspectives of each account may vary, some common elements can be corroborated such as the teams and players involved, the location and time of the game, the weather during the game, the plays which occurred, etc. Verifying common details may provide confidence that the source of the data is trustworthy and therefore their account can be trusted. By contrast, if elements of an individual's account conflicts with the majority of other accounts, then the individual, or their account of the event, may be deemed less trustworthy, and therefore their story may not be trusted. A first system 102 may additionally aggregate data, such as data about human history, and upon selection of one or more parameters, may generate a story comprised of one or more relevant accounts of subjects, events, and/or locations which may then be structured, such as in the chronological order of events, or as locations and/or features as a map, before being presented to a user. The first system may be implemented in the cloud.

A source database 104 stores data relating to sources of data, and particularly includes an indication of the trustworthiness or reliability of the source. A source may refer to an individual providing one or more stories, such as via oral dictation, uploading a recording, providing a written dictation, a pictorial representation, etc., or may alternatively refer to a written text, publication, publisher, website, company, or other organization, etc. A source may additionally refer to third party networks 132, third party databases 134, IoT data sources 136, etc. In some embodiments, a source may refer to a user device 138 or a camera 140 or a sensor 142. In some examples, a source may be associated, initiated on or instantiated by a website such as Wikipedia. In another embodiment, a source may be associated, initiated on or instantiated by a news company, website, or newspaper publisher such as Reuters or the Associated Press. In another embodiment, a source may be representative of a particular weather station or meteorologist. The source database 104 may store data regarding the ownership of the recording device, methods of recording, creation date, and time and geographical movement. The trustworthiness or reliability may be represented by a binary 'trustworthy' or 'untrustworthy' data type or may alternatively be represented by a qualitative range of values such as 'trustworthy', 'somewhat trustworthy', 'unknown trustworthiness', 'somewhat untrustworthy', or 'untrustworthy'. Similarly, trustworthiness or reliability may be represented by a quantitative value, such as a score. The score may represent a probability that the source can be trusted, which may be interpreted as the likelihood that the source is accurately describing the truth. A quantitative value may alternatively utilize a regressive method to adjust the source's reliability score based upon each accurate or inaccurate contribution which may comprise any of a story, object, object characteristic, etc. The reliability of the source may be determined based upon analysis of one or more stories which may be attributed to the source and/or one or more objects which may be attributed to the source. A story is a data record which may be comprised of one or more objects, which are individual data elements. The source database 104 may list the number of stories and the number of objects associated with the reliability score. Source reliability may additionally be impacted by credentials, such as whether a source is determined to be a specialist in a given field, or alternatively if manually adjusted. Additionally, the amount a reliability score is adjusted may be impacted by the degree to which the source's contribution is inaccurate or the relative reliability scores of corroborating sources and data. The source database 104 may be populated by a trust verification system. The source database 104 may be used by the server system 112, data collection module 114, subject module 116, event module 118, geography module 120, and may be further utilized by one or more optional modules such as a migrations module 124, catastrophe module 126, war module 128, historocity module 144, etc.

An event database 106 stores data related to time-related events or data comprising time-based data such as one or more dates, times, and may additionally include descriptions and/or characteristics of what occurred at the specific date and/or time of a combination of actions in a physical or metaphysical space completed by a human, AI, and/or digital object. The resolution of event data in respect to time may vary. For example, an event may reference a time accurate to a second or a fraction of a second, or may reference a specific minute, hour, day, week, month, year, or span of multiple years. For example, an event may describe the D-Day landings during World War II which occurred on Jun. 6, 1944. Alternatively, an event may describe World War II, which could be referenced as occurring between 1939 and 1945 or may more precisely be referenced as occurring between Sep. 1, 1939 and Sep. 2, 1945. Event data from one source may be associated with data from a plurality of other sources. Associated data may not match exactly. For example, if a first source referred to World War II as occurring between 1939 and 1945, while a second source referred to World War II as occurring between Sep. 1, 1939, and Sep. 2, 1945, the two references would be associated as they are both true, though they use different resolutions of time-based data as they both accurately describe World War II. The event database 106 may be populated by a data collection module 114 and is updated by an event module 118. The event database 106 may additionally be populated by one or more of a second system 130, third party network 132, third party database 134, IoT data source 136, user device 138, camera 140, or one or more sensors 142. The event database 106 is utilized by the event module 118, historocity module 144, and the perspective module 122. The second system may be implemented in cloud.

A geography database 108 stores data related to location related data such as a continent, country, state, city, town, street, address, building, etc. Location related data may also comprise GPS coordinates, regions, including common names, as well as geographic features, such as mountains, valleys, canyons, rivers, streams, lakes, oceans, etc. For example, a location may be a length of coastline called Omaha Beach in Normandy, France. In some embodiments, the geographic location may change based on the passage of time. For example, the coastline is otherwise not known as Omaha Beach until 1944, when it was given the designation during the planning and execution of the D-Day landings. Location from one source may be associated with location data from other sources. Associated data may not match exactly. For example, Omaha Beach may be associated with Normandy, France. Likewise, France may be associated with Europe. Other examples may comprise Wallstreet in Manhattan, New York. Likewise, Manhattan, New York may be associated with New York City, New York. New York City may also be referred to as the Big Apple, and was historically known as New Amsterdam, therefore such references may be associated. The geography database 108 may be populated by a data collection module 114 and is updated by a geography module 120. The geography database 108 may additionally be populated by one or more of a second system 130, third party network 132, third party database 134, IoT data source 136, user device 138, camera 140, or one or more sensors 142. The geography database 108 is utilized by the geography module 120, historocity module 144, and the perspective module 122.

A subject database 110 stores data related to subjects, which may be people, animals, objects, ai's, any word, feeling or "thing" which is not time or space, etc. In one embodiment, a subject database 110 stores data primarily related to people. The subject data may relate to specific people, or groups of people. Groups of people may be referenced directly or may comprise an aggregation of data about people belonging to or who can be associated with the group. For each subject, the subject database 110 may store a numerical value for the subject ID, a numerical value for the source ID received from the source database 104, and a description of the subject, such as a job title, a place of employment, physical description, or talents. The subject data may store subjects that are discrete elements of a story. The subject may have one or more parameters or features which describe an object, such as size, material, location, time, function, etc. The subject database 110 may additionally include an image of the original receipt of purchase, narrative information about where, why, and when the object was purchased and transferred. The subject database 110 may further include object verification score associated with each object.

The server system 112 initiates a data collection module 114 and receives data elements or assets collected and identified by the data collection module 114. The server system 112 selects a first data element and initiates a subject module 116, sending the selected data element and receiving subject data comprising data associated with the selected data element. The server system 112 initiating the event module 118, sending the selected data element and receiving event data comprising data associated with the selected data element. The server system 112 initiating the geography module 120, sending the selected data element and receiving location data comprising data associated with the selected data element. The server system 112 may then optionally initiate one or more optional modules, sending the selected data element and receiving data related to the optional module comprising data associated with the selected data element. If there are more data elements, another data element is selected and the subject module 116, event module 118, geography module 120, and optionally one or more optional modules, may be initiated for each selected data element. If there are not additional data elements, the server system 112 initiating the perspective module 122 and receiving data related to a perspective received from a user which has been aggregated and presenting the aggregate data to a user as a story. If the story is not complete, then initiating the perspective module 122 to receive additional perspective parameters to update the story. If the story is complete, then ending the story aggregation. The data collection module 114 is initiated by the server system 112 and then receives data from a data source which may be any of a user via a user device 138, a camera 140, one or more sensors 142, a second system 130, third party network 132, third party database 134, IoT Data Source, etc.

The data collection module 114 parses the received data to identify one or more data elements from the received data and queries a source database 104 for a source reliability score, or for data to facilitate determining a source reliability score. The received data, identified data elements, and source reliability score(s) are then saved to each the event module 118, the geography module 120, and the subject module 116 depending on the relevance of the identified data elements to each of the databases. In some embodiments, the identified data elements may additionally be saved to one or more optional modules such as a migrations module 124, a catastrophe module 126, a war module 128, etc. The identified data elements are then sent to the server system 112.

The subject module 116 is initiated by the server system 112 from which it receives a data element and queries a subject database 110. A subject similar to the received data element is selected and the received data element and the selected subject data are compared to determine whether they match. The functions of the subject module 116 is further described in operation 210 of FIG. 2 and FIG. 4.

The event module 118 is initiated by the server system 112 from which it receives a data element and queries an event database 106. An event similar to the received data element is selected and the received data element and the selected event data are compared to determine whether they match. The functions of the event module 118 are further described in operation 214 of FIG. 2 and FIG. 5.

The geography module 120 is initiated by the server system 112 from which it receives a data element and queries a geography database 108. A location similar to the received data element is selected and the received data element and the selected location data are compared to determine whether they match. The functions of the geography module 120 is further described in operation 216 of FIG. 2 and FIG. 6.

The perspective module 122 is initiated by the server system 112 and receives one or more perspective parameters describing a desired story to be generated. Each of the event database 106, geography database 108, and subject database 110 are queried, in addition to any relevant optional databases and data relevant to the received perspective parameters are selected. Each of the selected data records are arranged chronologically and based upon physical locations. In an example, the aggregated story comprising a summary of descriptions of an allied soldier's experience during the D-Day landings in Normandy, France on Jun. 6, 1944. The aggregated data, which may comprise further ordering, is returned to the server system 112.

The optional modules, migrations module 124, catastrophe module 126, and war module 128, receive a data element, query a relevant database, and compare the data retrieved from the database to the received data element to identify matching or associated data. The migrations module 124 utilizes data related to migrations of subjects, humans, animals and things, from one location to another. The migration data may include number of subjects, nationality, ethnicity, species of animals, location names, and the reasons for migration, such as war or famine. The data may comprise the opposite perspective, instead describing people arriving in a country and their country of origin. A migration module 124 may, in some examples, be initiated by the server system 112, and may return migration data to the server system 112.

The catastrophe module 126 utilizes data related to catastrophes, such as natural or manmade disasters, the magnitude of damage, which may be measured by the number of casualties, losses as a monetary figure, time required to repair the damage, wind speeds, precipitation amounts, duration. A catastrophe module 126 may, in some examples, be initiated by the server system 112, and may return catastrophe data to the server system 112.

The war module 128 utilizes data related to wars or other violent conflicts, the number of casualties, loss of equipment, losses as a monetary figure, time required to repair the damage, ordinance or ammunition used, number of troops deployed for a battle. A war module 128 may, in some examples, be initiated by the server system 112, and may return war data to the server system 112.

The historocity module 144, executed by the server system 112, is capable of calculating and managing combined historocity scores. The historocity module 144 receives initial data input from server system 112 and queries multiple databases within the network, specifically the source database 104, event database 106, geography database 108, and subject database 110, to aggregate and analyze a data related to the historical value of an object in the system based on a plurality of data points. These data points may include the provenance of artifacts, historical relevance or popularity of people or events, geographical significance, and subject-specific details. The module synthesizes this information to calculate a combined historocity score, which may be broken down into constituent sub-scores like historicity, social value, monetary value, and relational value. This score encapsulates a multi-dimensional valuation of subjects, whether physical objects or digital entities. The historocity module 144 is also capable of interfacing with third-party networks 132 to enrich its data set, validate source reliability, and facilitate a more robust scoring mechanism. The calculated combined Historocity Score, along with any pertinent sub-scores, are then saved back to the subject database 110 and may also be communicated back to the Server system 112 for further utilization or dissemination.

The historocity database 146 is a component of the first system 102 that serves as a repository for the multi-dimensional evaluation of data elements and their defining and differentiating attributes, this may include utilizing a SIO system. The database may store, index, and query a diverse range of data points essential for the calculation of historocity scores. These data points include but are not limited to: historicity sub-scores, social value sub-scores, relational value sub-scores, and monetary value sub-scores. Each SIO is uniquely identified within the database through a distinct identifier, such as a hash or a unique identification code, to facilitate precise retrieval and modification of SIO records. The database is designed to be compatible with a plurality of data sources, enabling it to ingest data from various databases including but not limited to: source database 104, event database 106, geography database 108, and subject database 110. Data within historocity database 146 is stored in normalized relational tables to ensure data integrity and facilitate efficient querying. Additionally, the database employs indexing mechanisms to accelerate the retrieval of complex, multi-attribute queries that are essential for the calculation or updating of historocity scores. The schema of the database is configured to include fields that capture both qualitative and quantitative metrics, and it is extensible to accommodate future metrics and attributes that may be deemed necessary for the calculation of more accurate or nuanced historocity scores.

An object corroboration module 148 compares object characteristics of an object against object characteristics of similar objects and adjusts the object verification score based upon whether the object characteristics match the characteristics of similar objects, which may include identifying whether the object is the same object or type of object, described in another story.

A story verification module 150 identifies each object in a story, determines a story verification score of an object based on the source score or the object verification score or both, and adjusts the story verification score by aggregating the story verification score of the objects comprising the story. A second system 130 is a distributed network of computational and data storage resources which may be available via the internet or by a local network. A second system 130 accessible via the internet is generally referred to as a public cloud whereas a second system 130 on a local network is generally referred to as a private cloud. A second system 130 may further be protected by encrypting data and requiring user authentication prior to accessing its resources. A third party network 132 is comprised of one or more network resources owned by another party. For example, a third party network 132 may refer to a service provider, such as social networks (e.g., Facebook, Instagram, YouTube, Reddit, Snapchat, Twitter/X, LinkedIn, or TikTok), a news website, a publication, a weather provider, or a combination thereof. A third party database 134 stores data owned by another party. For example, a third party database may store data on a third party network, or may alternative comprise archival data, historical accounts, survey results, customer feedback, social media posts, etc. In some examples, a third party database 134 may include, for example, World War II photos from the National Archives. An IoT (Internet of Things) data source 136 is an internet connected device which may comprise one or more sensors or other sources of data. IoT data sources 136 may comprise appliances, machines, and other devices, often operating independently, which may access data via the internet, a second system 130, or which may provide data to one or more internet connected devices or a second system 130.

A user device 138 is a computing device which may comprise any of a mobile phone, tablet, personal computer, smart glasses, audio, or video recorder, etc. In some embodiments, a user device 138 may include or be comprised of a virtual assistant. In other embodiments, a user device may comprise one or more cameras 140 and/or sensors 142. A user device may comprise a user interface for receiving data inputs from a user. A camera 140 is an imaging device or sensor 142 which collects an array of light measurements which can be used to create an image. One or more measurements within the array of measurements can represent a pixel. In some embodiments, multiple measurements are averaged together to determine the value(s) to represent one pixel. In other embodiments, one measurement may be used to populate multiple pixels. The number of pixels depends on the resolution of the sensor 142, comprising the dimensions of the array of measurements, or the resolution of the resulting image. The resolution of the camera 140 sensor 142 does not need to be the same as the resolution of the resulting image. A camera 140 may be a component in a user device 138 such as a mobile phone, or alternatively may be a standalone device. In some embodiments, a camera 140 may be analog, where an image is imprinted on a film or other medium instead of measured as an array of light values. A sensor 142 is a measurement device for quantifying at least one physical characteristic such as temperature, acceleration, orientation, sound level, light intensity, force, capacitance, etc. A sensor 142 may be integrated into a user device 138, such as an accelerometer in a mobile phone, or may be a standalone device. A sensor 142 may also be found in an IoT data source 136 or a third party network 132.

Figure 2:
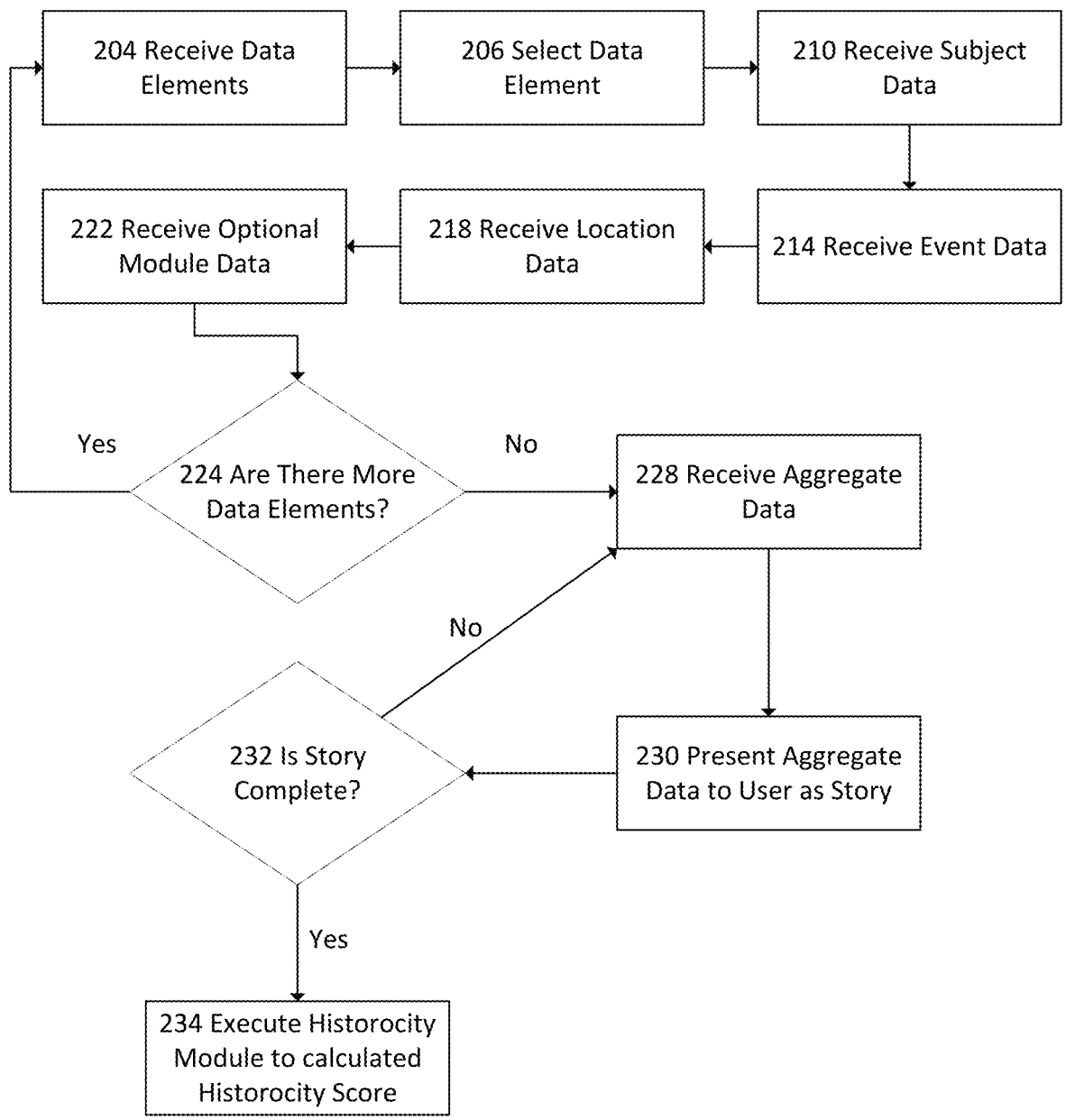
FIG. 2 is a flowchart illustrating an exemplary function of a server system.

FIG. 2 is a flowchart illustrating an exemplar function of the server system 112. The process begins with initiating the data collection module 114. The data collection module 114 receives data from at least one data source and identifies data elements comprising the received data such as discrete events, locations, people, items, etc. The data collection module 114 queries the source database 104, determines a source reliability score, saves event data to the event database 106, location data to the geography database 108, and subject data to the subject database 110. The saved event data, location data, and subject data may additionally be accompanied by a source reliability score.

The server system 112 receives the identified data elements from the data collection module 114 at operation 204. For example, a data element may be a subject, a US soldier named John Smith who was a member of the 16th infantry regiment. A data element may be an event, such as the D-Day landings on Jun. 6, 1944. In another embodiment, the data element may comprise location data such as coastline called Omaha Beach in Normandy, France. The data elements may additionally include names of other soldiers who may have participated in and/or been killed during the battle. The data elements may additionally comprise the equipment used, ammunition, etc.

The server system 112 selects, at operation 206, a data element from the at least one data element received from the data collection module 114. In an example, the soldier, John Smith, is selected. In an alternate embodiment, the D-Day landings at Omaha Beach is selected.

The server system 112 initiates the subject module 116, which receives data comprising at least one subject, queries the subject database 110, selects a subject similar to the received subject data, and determines whether the selected subject data matches the received subject data. If the data matches, the received data as matching the selected subject to the subject database 110. If the subject data does not match, the server system 112 checks whether there are more similar subjects. If there are more similar subjects, the server system 112 selects another subject and determines whether the selected subject data matches the received subject data. If the received subject data does not match any data from the subject database 110, the server system 112 saves the received subject data as a new subject to the subject database 110.

The server system 112 receives, at operation 210, the subject data from the subject module 116, the subject data comprising matched subjects and/or newly identified subjects. Subjects may comprise people or things. Matching subjects are associated so as to add new details to an existing subject and/or corroborate existing details. Subject data may additionally be accompanied by a source score which indicates the reliability of the source. The reliability of the source may be retrieved from the source database 104 and/or may utilize a story corroboration system or other method of determining the reliability of the received data.

The server system 112 initiates the event module 118, which receives data comprising at least one event, queries the event database 106, selects an event similar to the received event data, and determines whether the selected event data matches the received event data. If the data matches, the received data is saved as matching the selected event data to the event database 106. If the event data does not match, the server system 112 checks whether there are more similar events. If there are more similar events, then the server system 112 selects another event and determines whether the selected event data matches the received event data. If the received event data does not match any data from the event database 106, then the received event data is saved as a new event to the event database 106.

The server system 112 receives, at operation 214, the event data from the event module 118. The event data comprising matched events and/or newly identified events. Events may comprise discrete or notable actions, or other time-based data. In some embodiments, an event may refer to something which occurred or the state of people, things, etc. at a specific date and/or time. The resolution of time may be one or more years, months, weeks, days, hours, minutes, seconds, etc. Matching events are associated so as to add new details to an existing event and/or corroborate existing details. Event data may additionally be accompanied by a source score which indicates the reliability of the source. The reliability of the source may be retrieved from the source database 104 and/or may utilize a story corroboration system or other method of determining the reliability of the received data.

The server system 112 initiates the geography module 120 that receives data comprising at least one location and querying the geography database 108, selects a location or location characteristic similar to the received location data, and determines whether the selected location data matches the received location data. If the data matches, the received data is saved as matching the selected location data to the geography database 108. If the location data does not match, the server system 112 checks whether there are more similar locations. If there are more similar locations, then the server system 112 selects another location and determining whether the selected location data matches the received location data. If the received location data does not match any data form the geography database 108, then the received location data is saved as a new location to the geography database 108.

The server system 112 receives, at operation 218, the location data form the geography module 120. The location data comprises matched locations and/or newly identified locations. Locations may describe countries, regions, cities, towns, villages, streets, buildings, etc. or may alternatively comprise a set of coordinates such as GPS or map coordinates. The resolution of location may comprise a distance or area of any scale ranging from inches or feet, millimeters or meters, to hundreds or thousands of miles or kilometers. In some embodiments, locations may be described by natural geographic features such as lakes, rivers, streams, mountains, valleys, canyons, etc. Matching locations are associated so as to add new details to an existing location and/or corroborate existing details. Location data may additionally be accompanied by a source score which indicates the reliability of the source. The reliability of the source may be retrieved from the source database 104 and/or may utilize a story corroboration system or other method of determining the reliability of the received data.

The server system 112 initiates one or more optional modules such as a migrations module 124, catastrophe module 126, war module 128, etc. which may operate similarly to the subject module 116, event module 118, and geography module 120. The optional module(s) may query a relevant database and compare the selected data element to data stored in the relevant database(s) to identify matching data elements. The optional modules may compare specific data types beyond subject, event, or location data. An optional module may be a catastrophe module 126 which may compare data relating to natural or manmade disasters. An optional module may further be a war module 128 which may compare data specific to wars or other violent conflicts such as battle locations, casualties, military units involved, etc. The optional modules storing the results of data comparisons to relevant databases, which may additionally include a source reliability score.

The server system 112 receives, at operation 222, data from one or more optional modules such as a migrations module 124, catastrophe module 126, war module 128, etc. The received data may further include a source reliability score.

The server system 112 checks, at operation 224, whether there are more data elements. If there are more data elements, then the server system 112 returns to operation 206 and selects another data element. In some examples, there is another data element comprising the description of a dog, therefore the server system 112 returns to operation 206 and selects the data element comprising the description of the dog. In an alternate embodiment, there are no more data elements.

The server system 112 initiates the perspective module 122, which receives a perspective from the user. The perspective may comprise any one or more of a subject, event, geography, etc. For example, a perspective may comprise a soldier during World War II, or more specifically may be a US soldier during the D-Day landings in Normandy France. The perspective module 122 querying the event database 106, the geography database 108, and the subject database 110 for data relating to the provided perspective. The related data is then used to create a timeline of events, a map of events, and may additionally summarize a plurality of perspectives such as from multiple subjects. For example, solider accounts may be summarized, or a representative account selected if the perspective is a plurality or unspecified soldier. In some embodiments, additional modules may be utilized to identify, match, and retrieve more specific types of data. For example, a war module 128 may identify, match, and retrieve data related to wars and other violent events.

The server system 112 receives, at operation 228, the aggregate data from the perspective module 122. The aggregate data being assembled to form a story such as via a chronological account of events. The aggregate data may comprise a plurality of accounts, which may be summarized from a plurality of subject, event, or geography data. In some embodiments, the aggregate data may comprise generalizations or inferences from the available data. In other embodiments, the aggregate data may be more specific, such as a narrative describing the events surrounding a man named John Smith, a soldier of the United States' 16th infantry regiment who stormed the Omaha Beach on the coast of Normandy, France on Jun. 6, 1944, during Operation Overlord, also known as the D-Day landings.

The server system 112 presents, at operation 230, the aggregate data to the user as a story. The aggregate data may be presented to the user as one or more of a summarized document, a dashboard or graphical user interface of events, subjects, and locations, a timeline of events, an audio recording which may further comprise a plurality of first or secondhand accounts, etc. The story may further make use of generative language model(s) (and/or other machine learning model(s)) such as a generative pre-trained transformer (GPT) or other LLM to provide a story using natural language. In some embodiments, the story may be presented in an interactive format similar to OpenAI's ChatGPT which allows a user to ask questions or otherwise provide prompts to further receive additional aggregate data associated with the story.

The server system 112 determines, at operation 232, if the story is complete. The story is complete if the user does not require any additional information or does not wish to modify the received story. In some examples, the user is satisfied, and the story is considered complete. If the story is not complete, the server system 112 initiates the perspective module 122 and receives additional aggregate data. In some examples, the user provides feedback altering the perspective, such as via a conversational user interface, requesting the perspective of a specific allied soldier during the World War II battle of Iwo Jima.

At operation 234, the server system 112 executes the historocity module to calculate the historocity score. After the completion of an aggregated narrative, the narrative or the combined building blocks of the story may be assessed for its historocity value using the historocity module 144. The module computes the value of the object in one or many value systems, such as historical, social, monetary, cultural, etc. For example, the historocity score of an authenticated MLB baseball hit by Roberto Clemente may be assessed.

Figure 3:
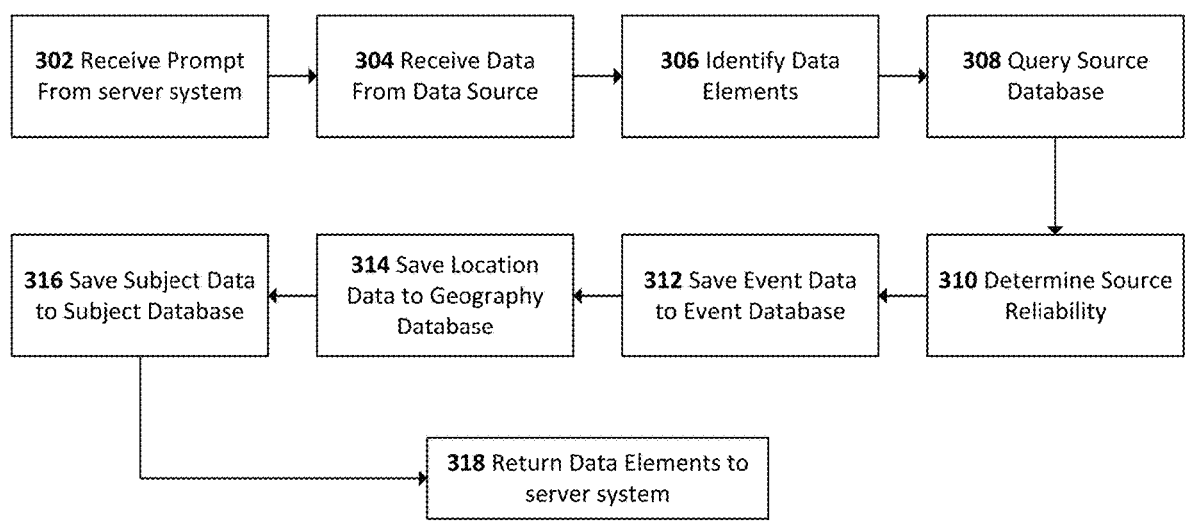
FIG. 3 is a flowchart illustrating an exemplary function of a data collection module.

FIG. 3 is a flowchart illustrating an exemplary function of the data collection module 114. The process begins with receiving, at operation 302, a prompt from the server system 112 to begin collecting data from at least one user and/or data source. Operation 304 includes receiving data from at least one data source. In some examples, the data source may comprise a user using a user device 138. The user may manually input data via a physical or virtual keyboard interface or may alternatively dictate the input data verbally or upload one or more images taken by one or more cameras 140. The data source may alternatively comprise any of a second system 130, third party network 132, third party database 134, IoT Data Source 136, camera 140, sensors 142, or a user device 138. The data collection may be passive, such as passively recording from a camera 140 or one or more sensors 142 which may include a microphone. The data collection may also comprise receiving data from remote sources, such as a second system 130, third party network 132, third party database 134, or an IoT data source 136. Likewise, a camera 140 may be one or more security cameras observing one or more individuals, locations, events, etc.

Operation 306 includes parsing and identifying at least one object data element from the received data. An object data element may comprise a data characteristic, such as a person, animal, object, location, time, event, etc. Object data elements may be identified differently depending upon the format of the data comprising the story. For example, if the data is provided as text, a transcription, or an audio dialogue, the language may be analyzed, primarily segregating by nouns and verbs, and further evaluating whether each noun or verb references a discrete object element. Nouns may indicate a person, animal, object, location, time, events, etc. whereas verbs may additionally refer to events. Alternatively, the data may be subjected to an algorithm or utilize machine learning, optical character recognition (OCR), and/or AI to use methods such as a convolutional neural network to segregate the content into discrete object elements while additionally accounting for context. Image and video may utilize image recognition to identify objects and object characteristics. In some embodiments, objects may be manually defined or refined. An object data element may be a subject, a US soldier named John Smith who was a member of the 16th infantry regiment. An object data element may be an event, such as the D-Day landings on Jun. 6, 1944. In another embodiment, the object data element may comprise location data such as coastline called Omaha Beach in Normandy, France. The object data elements may additionally include names of other soldiers who may have participated in and/or been killed during the battle. The object data elements may additionally comprise the equipment used, ammunition, etc.

Operation 308 includes querying the source database 104 for a score indicating the reliability of the data source from which the data was received. The data score may be binary, indicating whether the data source is trustworthy or not. Alternatively, the data score may be a fixed scale, with several degrees of trust or reliability between a minimum and maximum value. In other embodiments, the data score may be numerical with no fixed scale. Likewise, the scale may comprise only positive values, or may additionally allow negative values. In some examples, the source reliability score is numerical and not on a fixed scale, and the larger the number, the more reliable the source.

Operation 310 includes determining the reliability of the source by retrieving a source score from the source database 104. In some examples, the source score for the current data source is 432. In an alternate embodiment, the source does not have a source score and therefore is assigned a default value of 100. In other embodiments, a story verification module is used to verify and corroborate the accuracy of the contributed story to determine the source reliability score.

Operation 312 includes saving identified event data to the event database 106. The event data may additionally comprise a source reliability score. Operation 314 includes saving identified location data to the geography database 108. For example, the location data may include a location of D-Day landing, references to the beach names used by the allies, and a source reliability score. Operation 316 includes saving identified subject data to the subject database 110. The subject data may additionally comprise a source reliability score.

Operation 318 includes returning the identified data elements, and source reliability score(s) to the server system 112. In some examples, the data collection module may be generated, organized, categorized, interpreted, and/or modified by an artificial intelligence and/or machine learning algorithm, such as, for example, a large language model (LLM) which may be trained on large data sets to produce humanlike story data based on prompt(s) from a user or system.

Figure 4:
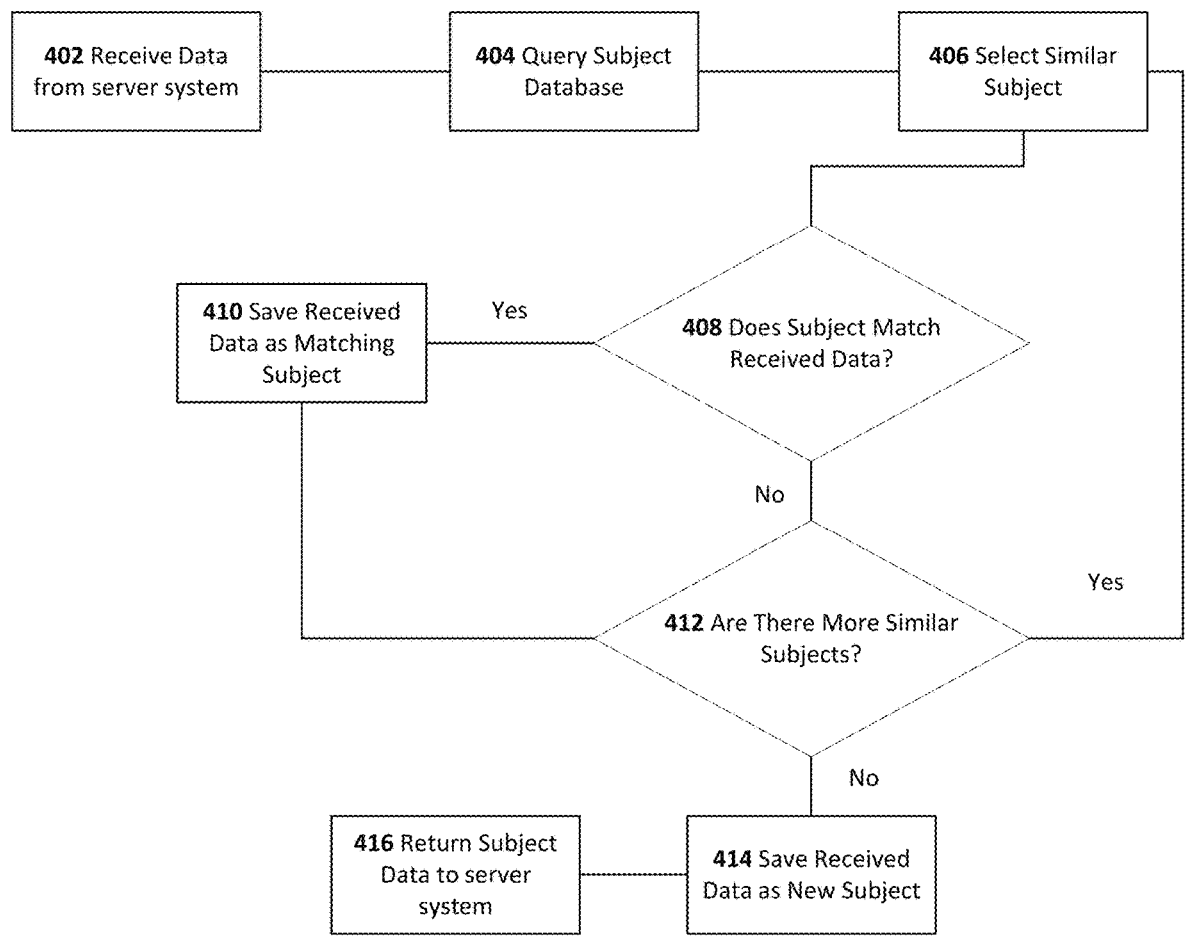
FIG. 4 is a flowchart illustrating an exemplary function of a subject module.

FIG. 4 is a flow chart illustrating an example of a function of the subject module 116. The process begins with receiving, at operation 402, data from the server system 112. The data comprising an identified data element which may include data elements representing subjects such as people, animals, objects, etc. The subject may be specific, such as a specific person, or may be more general, such as referring to all or any person matching a description, such as nationality, resident of a particular village, having blue eyes, brown hair, or wearing a green uniform, etc. Operation 404 includes querying the subject database 110 for subject data which is similar to the received subject data element. For example, if one of the received subject data elements comprises a description of a soldier, then the server system 112 queries the subject database 110 for data related to soldiers.

Operation 406 includes selecting a subject from the subject database 110 similar to the received data element. The received data element may include the description of a soldier, therefore the server system 112 selects a subject from the subject database 110 describing a soldier.

Operation 408 includes determining whether the selected subject from the subject database 110 matches the description in the received data element sufficient to confirm that both descriptions describe the same subject. For example, matching a specific soldier may require that the uniform is the same, as well as a name, which may be present on the uniform, and/or a description of the soldier including height, build, facial features, scars, name tag etc. If the subjects do not match, then the server system 112 checks if there are more similar subjects. The data does not need to be an exact match but be within a certain threshold values of differences. For example, if the height is off by an inch, but all other descriptions match, the discrepancy may be regarded as being within a threshold value. On the other hand, if the descriptions have differences in a key detail, such as the name on a nametag, then the discrepancy cannot be resolved, unless the description included a statement that the individual was wearing another person's uniform or nametag. It should also be noted that a data match may either be exact, such as a specific person, or may be generalized or more relative, such as matching the description of an American soldier during World War II.

Operation 410 includes saving the received data as matching the selected data to the subject database 110. A source reliability score may additionally be determined and saved to the subject database 110 with the matched data. Operation 412 includes checking whether subject database 110 includes more subjects that are similar to the received data element. If there are more similar subjects, then the server system 112 returns to operation 406 and selects an additional subject. In some examples, an additional element describes another soldier in a green uniform, causing the server system 112 to return to operation 406 and select subject(s) describing the soldier in the green uniform. In some examples, there are no additional subjects similar to the received data element.

Operation 414 includes saving the received data to the subject database 110 as a new subject if the received data element does not match any existing data records from the subject database 110. A source reliability score may additionally be determined and saved to the subject database 110 with the new subject data. In some examples, the source reliability score may be set to a default value if another value is not provided. Operation 416 includes returning the subject data to the server system 112. The subject data may comprise the received data elements and/or the data elements from the subject database 110 to which it matched.

Figure 5:
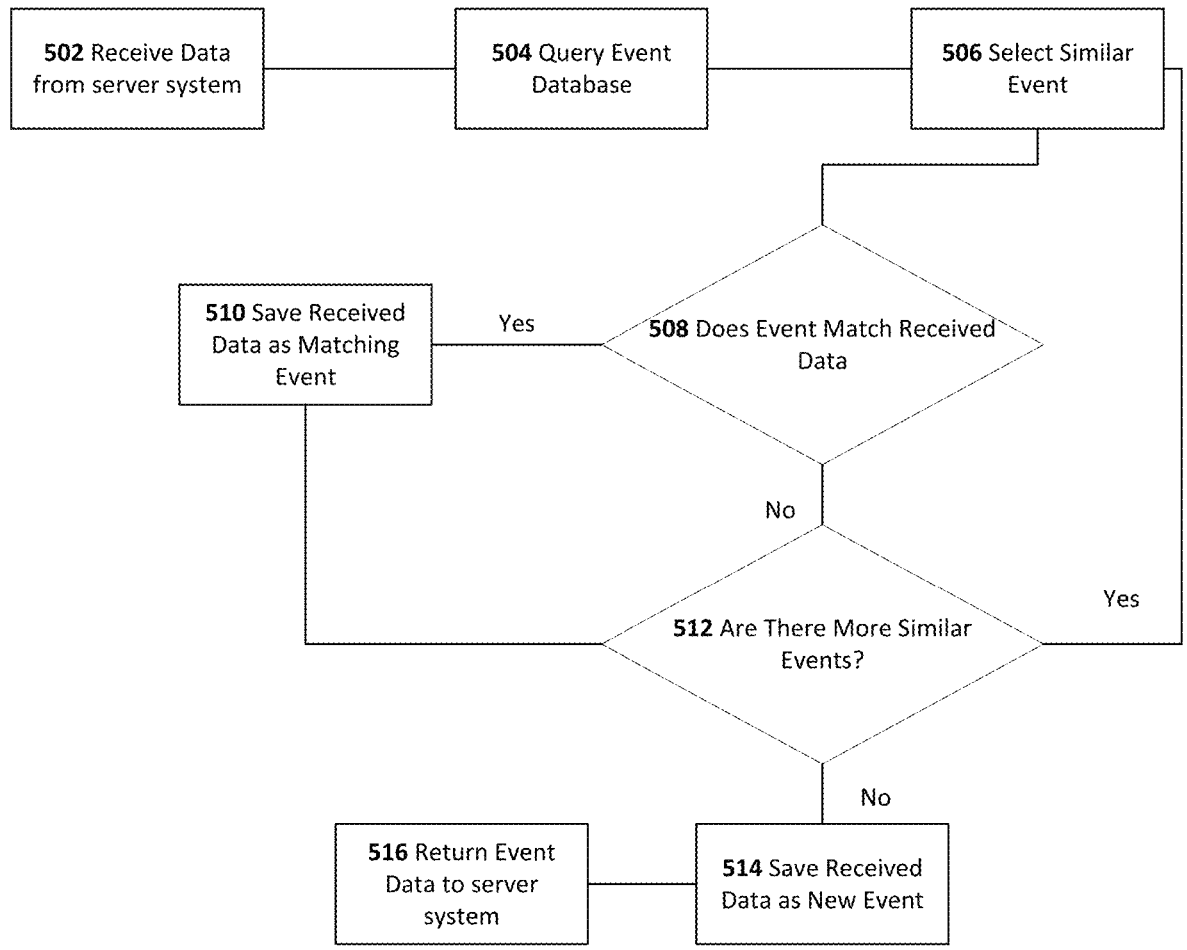
FIG. 5 is a flowchart illustrating an exemplary function of an event module.

FIG. 5 is a flowchart illustrating an example of a function of the event module 118. The process begins with receiving, at operation 502, data from the server system 112. The data may include an identified data element which may include data elements representing events or time related data such as a date and/or time of death, birth, election, concert, parade, rocket launch, moon landing, technology, the start and/or end of a war, battle, pandemic, storm or other weather event, government policy, etc. The event data may include a range of resolutions, such as a year, month, week, day, hour, minute, second, etc. The event data may be segmented by time period, such as the ancient era, the Middle Ages, the modern era, etc.

Operation 504 includes querying the event database 106 for event data which is similar to the received event data element. For example, if the received event data elements relate to a weather event, such as a tornado, then the server system 112 queries the event database 106 for data related to tornados. Operation 506 includes selecting an event from the event database 106 similar to the received data element. In some examples, the received data element includes the description of a battle during World War II, thus the server system 112 selects an event from the event database 106 describing a World War II battle.

Operation 508 includes determining whether the selected event from the event database 106 matches the description in the received data element sufficient to confirm that both descriptions describe the same event. For example, matching a World War II battle may comprise identifying the types of resources deployed, such as whether there were tanks deployed, or aircraft, and which units were deployed, such as specific infantry companies. If the events do not match, then the server system 112 checks if there are more similar events. In some examples, the received data describes a battle involving the amphibious landing of the US 16th infantry regiment and the selected event is the Normandy landings during World War II. The data is determined to be a match as the US 16th infantry regiment was a participant in the Normandy landings at Omaha Beach.

Operation 510 includes saving the received data as matching the selected data to the event database 106. A source reliability score may additionally be determined and saved to the event database 106 with the matched data. Operation 512 includes checking whether there are more events from the event database 106 which are similar to the received data element. If there are more similar events, then the server system 112 returns to operation 506 and selects an additional event. In some examples, an additional element describes an amphibious assault of an island in the Pacific Ocean, therefore the server system 112 returns to operation 506 and selects the event describing an amphibious assault of an island in the Pacific Ocean. In an alternate embodiment, there are no additional events similar to the received data element. Operation 514 includes saving the received data to the event database 106 as a new event if the received data element does not match any existing data records from the event database 106. A source reliability score may additionally be determined and saved to the event database 106 with the new event data. In some embodiments, the source reliability score may be a default value. Operation 516 includes returning the event data to the server system 112. The event data may comprise the data elements and/or the data elements from the event database 106 to which it matched.

Figure 6:
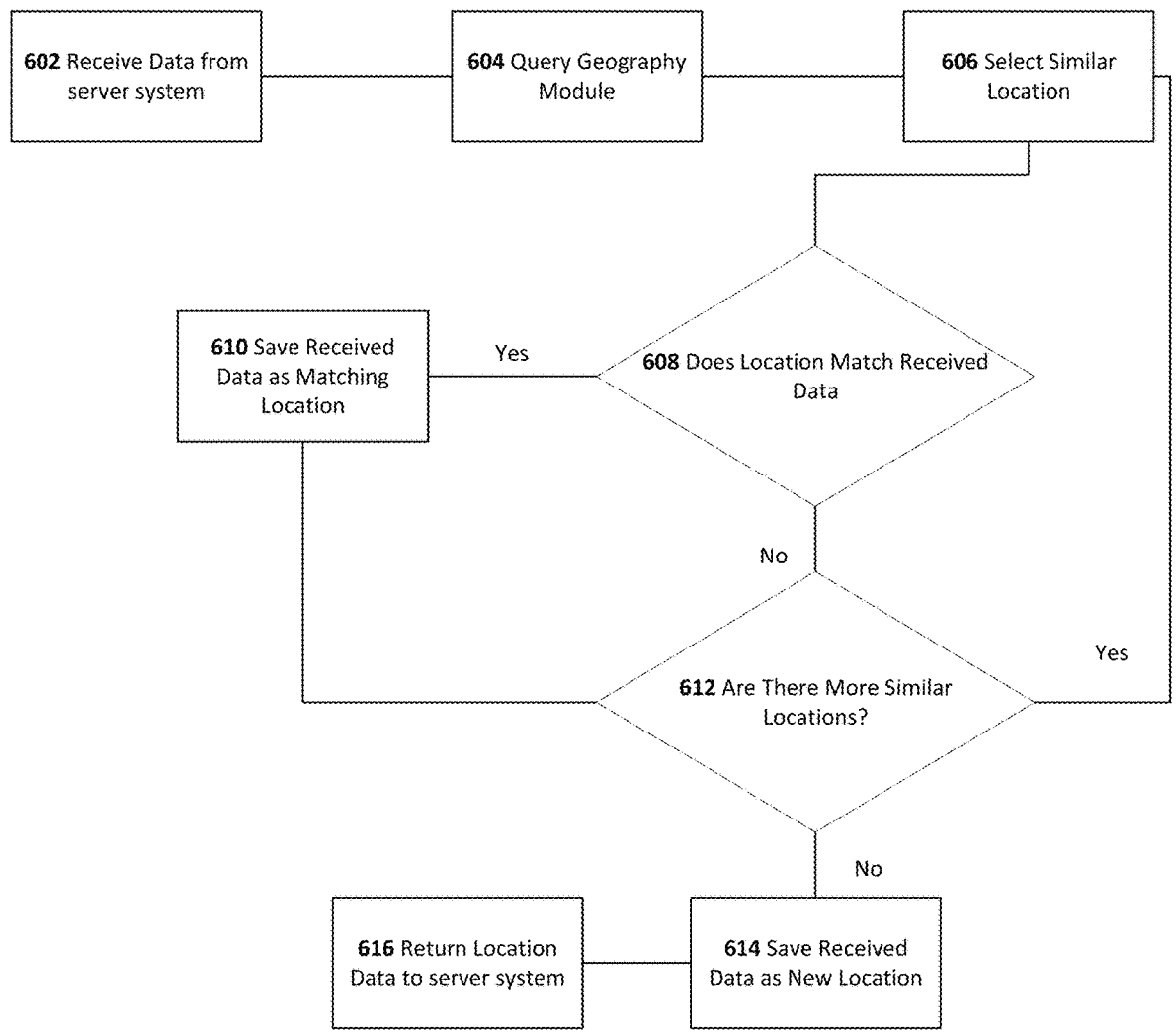
FIG. 6 is a flowchart illustrating an exemplary function of a geography module.

FIG. 6 is a flowchart illustrating an example of a function of the geography module 120. The process begins with receiving, at operation 602, data from the server system 112. The data may include an identified data element which may be data elements representing locations such as countries, states, provinces, cities, towns, streets, buildings, GPS coordinates, a mountain, river, ocean, lake, etc. The location may be referred to by a plurality of names by different people.

Operation 604 includes querying the geography database 108 for location data which is similar to the received location data element. For example, if one of the received event data elements comprises a description of a battlefield on the coast of France, then the server system 112 queries the geography database 108 for data related to coastal regions in France. The geography database 108 may further specify coastal regions where battles occurred, refining the data query. Operation 606 includes selecting a location from the geography database 108 similar to the received data element. In some examples, the received data element may comprise the description of a battlefield on the coast of France, therefore the server system 112 selects a location from the geography database 108 describing coastal regions in France. The coastal regions may be identifiable based upon names given to beaches, town or city names, or names assigned to operational regions used during one or more battles during one or more wars. In some examples, the server system 112 selects the beaches of Normandy, France.

Operation 608 includes determining whether the selected location from the geography database 108 matches the description in the received data element sufficient to confirm that both descriptions describe the same location. For example, matching a battlefield on the coast of France may comprise matching location names, GPS coordinates, physical landmarks, or descriptions of the terrain. If the location descriptions do not match, then the server system 112 checks if there are more similar locations. In some examples, the received data describes a battlefield on the coast of France, and the server system 112 determines that the battlefield, depicted in an image, matches a region of the beaches of Normandy, specifically Omaha Beach. Operation 610 includes saving the received data that matches the selected data to the geography database 108. A source reliability score may be determined and saved to the geography database 108 with the matched data.

Operation 612 includes checking whether there are more locations from the geography database 108 which are similar to the received data element. If there are more similar locations, then the server system 112 returns to operation 606 and selects an additional location. In an alternate embodiment, there are no additional locations similar to the received data element. Operation 614 includes saving the received data to the geography database 108 as a new location if the received data element does not match any existing data records from the geography database 108. A source reliability score may additionally be determined and saved to the geography database 108 with the new location data. In some embodiments, the source reliability score may be a default value. Operation 616 includes returning the location data to the server system 112. The location data may comprise the received data elements and/or the data elements from the geography database 108 to which it matched.

Figure 7:
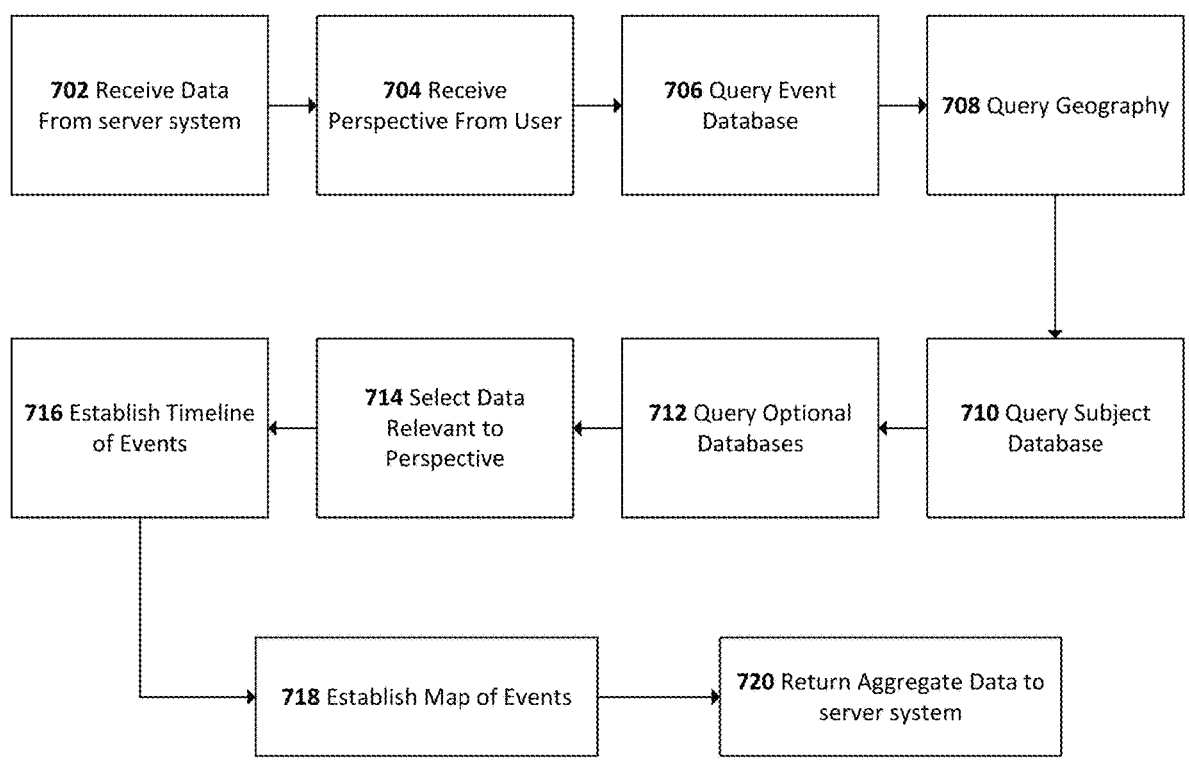
FIG. 7 is a flowchart illustrating an exemplary function of a perspective module.

FIG. 7 is a flowchart illustrating an example of a function of the perspective module 122. The process begins with receiving, at operation 702, data from the server system 112, the data comprising any of source, geography data, event location, or subject data. The received data may further comprise data from any additional optional modules such as a migrations module 124, catastrophe module 126, war module 128, etc. Operation 704 includes receiving a perspective from a user. A perspective may comprise query parameters describing a narrative or story about human history. For example, the perspective may relate to a person and/or, a location and/or an event. The perspective may further relate to a specific time period, a group of people, a location, etc. or any combination thereof. The perspective may comprise a plurality of descriptors, such as a US soldier during World War II. The level of requested detail may vary, such as relating not only to a US soldier, but a US soldier of the 16th infantry regiment. The request may further specify a soldier named John Smith. Likewise, the time detail may be general, encompassing a specific soldier's entire life, or may be specific to an event, such as World War II, or more specifically, the D-Day landings at Omaha Beach in Normandy, France. The request may be further refined to comprise only the day of the landings or may be further expanded to include the time period from Jun. 6, 1944, until all five beaches targeted during Operation Overlord were connected on Jun. 12, 1944. Likewise, the perspective may relate to a specific location or multiple locations. Additional information which may have been identified during optional modules, such as a war module 128, may also be referenced, such as including the deadliest battles of World War II, including only battles where more than 10,000 casualties were recorded on a single day, or where more than 100 tanks and/or planes were lost in a 24-hour period.

Operation 706 includes querying the event database 106 to retrieve time-based data related to the perspective received from the user. The data may comprise the start and end time of Operation Overlord, when a specific unit, such as the United States' 16th infantry regiment made landfall, or when events occurred during the landing, such as when a specific unit was wounded or killed. Operation 708 includes querying the geography database 108 for location-based data related to the perspective received from the user. The details may comprise information about the terrain, physical landmarks, high and low tide marks, etc. Operation 710 includes querying the subject database 110 for subject-based data related to the perspective received from the user. Operation 712 includes querying one or more optional databases which may store data relevant to the perspective received from the user, such as details relating to the casualties of the D-Day landings, equipment used, amount of ammunition and other resources consumed, strategic analysis of the events, subjects, and/or location by expert sources.

Operation 714 includes selecting data relevant to the perspective received from the user. The data selection may comprise the use of an application of search criteria to filter the data. Alternatively, an algorithm may be used to identify the most relevant data and filter out irrelevant or less relevant data. Further, an algorithm may comprise a machine learning model including but not limited to a language model such as a generative pre-trained transformer. Operation 716 includes establishing a chronological timeline of relevant events from the data selected in response to the perspective received from a user, the timeline allowing each data reference to be referenced in the order in which the details it describes occurred or are relevant to a story relating to the perspective. Operation 718 includes establishing a map of relevant locations from the data selected in response to the perspective received from a user. The map allowing each data reference which can be associated with a location to be referenced relative to other data references to describe a physical space, either by generating a virtual representation of the location(s), compiling a collection or composite of relevant images, or to create a description of relevant locations. Operation 720 includes returning the aggregate data to the server system 112. The aggregate data comprising the components of a story and being organized at least by one or more of time and/or location. In some examples, the aggregate data comprising a narrative about a man named John Smith, a soldier of the United States' 16th infantry regiment who stormed the Omaha Beach on the coast of Normandy, France on Jun. 6, 1944, during Operation Overlord, also known as the D-Day landings.

Figure 8:
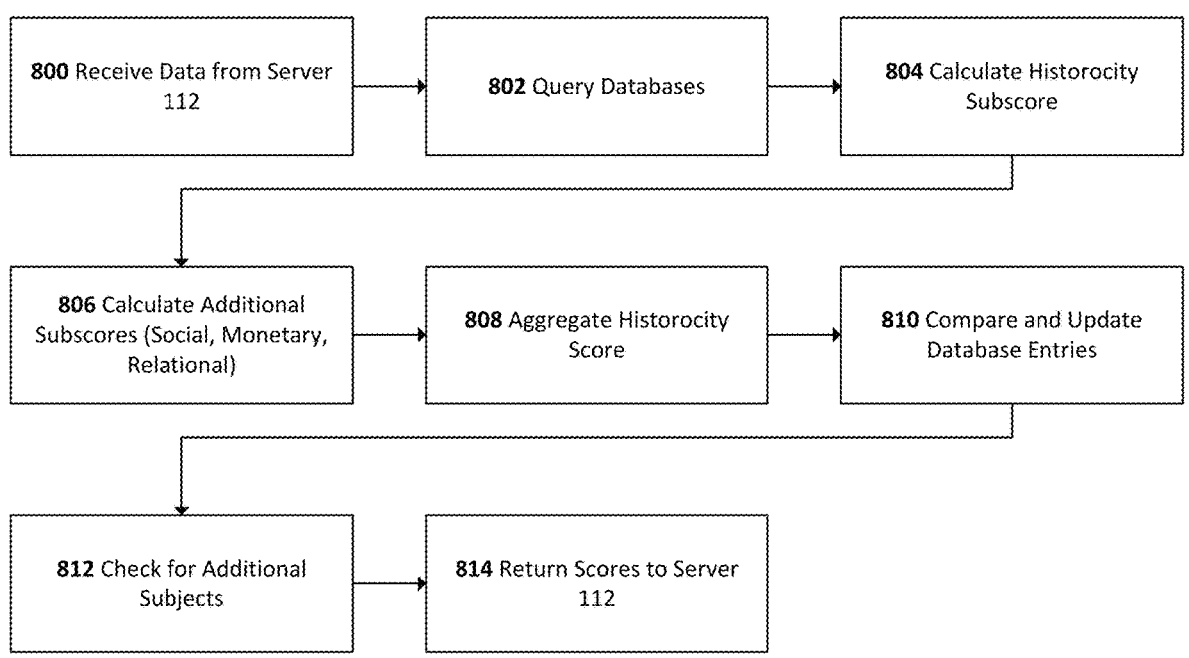
FIG. 8 is a flowchart illustrating an exemplary function of a historicity module.

FIG. 8 is a flowchart illustrating an example of a function of an Historocity Module 144, for calculating an Aggregate or a combined Historocity Score. At operation 800, the Historocity Module 144 receives data pertaining to at least one data element from the Server system 112 of the first system 102. The data comprises a plurality of elements such as physical properties, spatial and temporal information, relationships, emotions, metaphysical properties, stories, Historicity, social value, monetary value, and relational value, etc., that pertain to the data elements, which could encompass a wide range of entities including, but not limited to, artifacts, artworks, individuals, locations, and various other objects. The received data may derive from multiple databases within the network, such as the source database 104, event database 106, geography database 108, and subject database 110, enabling the aggregation of a comprehensive set of data elements for each data element. A historocity or historacity value or score is calculated based on an array of factors, including but not limited to the authenticity of the object, its social prominence, its economic worth, and its relational significance to other entities. For instance, applying this to authenticated baseballs used in Major League Baseball (MLB) games, the historocity score would aggregate various factors including historicity, which could start at a score of 80 due to MLB's trusted authentication system. Further dimensions such as social interaction scores, transactional values, and relationship scores with significant events or figures would then be integrated to derive a combined (or aggregate) historocity Score. This score could be employed for multiple purposes, including but not limited to ranking, filtering, and displaying the data elements in an interface designed to evaluate and compare historical values, thus fulfilling distinct needs for curators, researchers, collectors, and various other stakeholders.

At operation 802, the historocity database 146 is initially queried to retrieve existing historocity scores pertinent to the data element under consideration if they exist. This query employs unique identifiers or descriptors to retrieve any extant scores directly linked to the specific data element. Should the database yield an existing score, an additional evaluation is conducted to determine whether the score warrants updating, a decision informed by criteria such as time elapsed since last calculation, introduction of additional data, or other contextual shifts. In scenarios wherein no current historocity score exists or an update is deemed necessary due to an elapse of time or a receipt of new data, the operation proceeds to query multiple other databases of the first system 102 or third party database 134 to compile data relevant to the calculation or recalculation of the historocity score. Specifically, the source database 104 is queried to extract factual and foundational data directly related to the source of data related to the object, the event database 106 is consulted for historical events or significant moments involving or related to the object, the geography database 108 provides spatial data denoting the significance of geographical locations where the object has existed or been involved, and the subject database 110 furnishes information on entities such as individuals, organizations, or other objects that have interactions, relationships, or perspectives with the subject data element. These queries are designed to capture data associated with the data element, data related to objects of similar nature or category, and data tangentially related to the object based on a multitude of factors such as spatial significance, temporal relevance, social importance, and narrative weight. This collective data serves as the foundation for subsequent computational operations aimed at generating or updating the object's combined Historocity Score.

At operation 804, the first sub-score, which may be, for example, for historicity, is calculated by employing a methodology that leverages multiple validation criteria including event, materials, creator, manufacturer, distributor, relationship, transaction, physical appearance, likeness, or a combination thereof. In some embodiments, a normalized scale ranging from 1 to 100 may serve as the scoring metric, with a value of 1 representing low historicity and 100 indicating high historicity. In an illustrative example, the system may assess authenticated baseballs from Major League Baseball (MLB). Each baseball is assumed to have undergone an extensive and robust authentication process facilitated by MLB's provenance tracking system. A hologram affixed to each baseball, when scanned, accesses a database via a unique identifier to reveal metadata about the baseball, such as the games in which it was used and the specific plays it was involved in. In the context of MLB-authenticated baseballs, a baseline Historicity sub-score of 80 is pre-allocated, grounded in the high level of trust and certification ascribed to MLB's authentication process. This sub-score can be considered constant across all authenticated MLB baseballs in this particular scenario, serving as a foundational element for subsequent Historicity sub-score calculations. It is pertinent to note that, for comparative analysis, different types of plays—such as home runs or doubles—are not discriminated at this stage in the Historicity sub-score calculation, as the level of authentication, and hence the baseline Historicity, remains uniform. Further sub-scores can be used to refine this baseline to portray a nuanced picture of each baseball's true historical value.

At operation 806, the calculation of additional sub-scores is performed to refine the historocity score of an object, which may be, for example, authenticated MLB baseballs. The sub-scores include social value, relational value, and monetary value, each derived through distinct, quantifiable methodologies. The sub-scores may be calculated by training a machine learning model that tracks changing values of data elements that affect the sub-score calculation. In a first example, the social value sub-score is calculated. The social value sub-score may be a score that, for example. considers both online and offline interactions attributed to one or more MLB authenticated baseballs. This includes but is not limited to views, comments, likes, shares, and clicks, etc. All interactions across all MLB baseballs within the system are aggregated and then divided by the total number of MLB baseballs to arrive at a base per-interaction value. This base value is multiplied by the number of specific interactions associated with each individual baseball, yielding its unique social value sub-score. For instance, the "double baseball" has 1 million views and 100,000 comments, which place it in the top 1% of baseballs based on social value. On the other hand, the "home run ball" registers only 100 views and 3 comments, ranking it in the bottom 5% in terms of social engagement. This calculation adjusts the Historocity Score of the double baseball to 200 and the home run ball to 105. The relational value sub-score builds on the Historicity scores of entities and events directly related to the baseballs in question. For example, the double baseball was pitched by Warren Spahn, who has a historocity score of 80, in the Old Braves Stadium (which has a historocity score of 68), and was hit by Roberto Clemente (who has a historocity score of 90), for his 3,000th hit (which has a momentous historicity score of 99), during his final MLB at-bat (which has a historocity score of 80). The aggregate relational value for this particular baseball is calculated as the average of these scores, resulting in an additional 83.4 points to its historicity score. In comparison, the home run ball shares many of the same historical relations but differs in the nature of the hit. It was the hitter's final MLB home run with a score of 60 and was the 400th home run, scored at 80. Its aggregate relational value sub-score equates to 75.6, thus revising its historocity score to 180.6. Lastly, the monetary value sub-score is derived from an analytical assessment of historic and current market data. For instance, the double baseball is related to several high-value transactions, with 3,000th hit baseballs having been auctioned for amounts ranging from $5,000 to $500,000. Considering these values, the double baseball falls within the top 1% of baseballs in terms of monetary value, meriting a top score of 100 for this particular sub-score. This analytical framework allows for a nuanced, multi-dimensional evaluation that contributes to a more robust and granular understanding of each baseball's historocity score.

At operation 808, the combined historocity score (which can also be referred to as an aggregate historocity score or an average historocity score) is calculated by amalgamating various sub-scores, which may be, for example, those pertaining to Historicity, social value, relational value, and monetary value. The aggregation mechanism could be a function such as a weighted sum, a geometric mean, or a customized function that accounts for specific attributes of the object, such as its level of authentication or trust. This level of authentication can be quantified based on the source of the certification; for instance, Major League Baseball's (MLB's) provenance tracking system would serve as the most trusted authenticator for an MLB baseball, thus potentially influencing the weighting of the Historicity sub-score. In the example of MLB authenticated baseballs, two baseballs may be compared for an illustrative example, such as the double baseball and the home run ball. The double baseball has a historicity sub-score of 80, a social value sub-score of 100, a relational value sub-score of 83.4, and a monetary value sub-score of 100. One approach to calculate its combined historocity score could involve averaging these sub-scores, resulting in a final score of (80+100+83.4+100)/4=90.85. Alternatively, one could apply a weighted sum where the weights are determined based on the level of trust or importance of each sub-score. For instance, if historicity is deemed more crucial, its weight might be higher than that of social value. This weighted sum could then serve as the combined historocity score. In contrast, the home run ball has sub-scores including a historicity score of 80, a social value score of 5, a relational value score of 75.6, and a monetary value score of 60. Using the same weighted sum method, the aggregate score could be calculated with individual weights assigned to each sub-score, resulting in a combined historocity score that may be lower or higher depending on the weights applied. This methodology allows for a detailed, nuanced, and comprehensive valuation of the data elements, in this case, MLB baseballs, factoring in multiple dimensions of their historic and societal importance. This combined historocity score is not just a numerical representation but a quantifiable measure that considers both qualitative and quantitative attributes of the object in question. In some examples, a weighted average can be used in place of the weighted sum.

At operation 810, the calculated combined historocity score is compared against existing historocity scores in the historocity database 146. If a matching score exists, the database is updated. If no match is found, a new entry is created. In some embodiments, a reliability score is also calculated and stored with the combined historocity score, providing a quantifiable measure of the data's source reliability. At operation 812, the process determines if there are additional subjects related to the received data elements that require combined historocity score calculation. If such subjects are found, the process loops back to operation 806 for further calculation. The updated combined historocity score is further used to update the machine learning model.

Finally, at operation 814, the calculated combined historocity score and its constituent sub-scores are returned to the server system 112 for further processing or display. These returned scores may be utilized in ranking, filtering, and various other applications as part of an interface or system designed to evaluate and compare historical value. Different subjects may be ranked based on the respective combined historocity scores or the sub-scores. The subjects, their sub-scores, and the combined historocity scores may be displayed in order of increasing or decreasing scores representing rank. In alternate embodiments of the historocity module, additional functionalities are incorporated to provide a more comprehensive and interactive experience for users. The system enables users to dissect the combined historocity score into its constituent sub-scores, such as historicity, social value, monetary value, and relational value. Upon user request, the system displays the data elements and calculations that contributed to each sub-score. For the monetary value sub-score, for instance, the system may display comparable objects and their sell events, including the seller, purchaser, amount paid, and source of information. A timeline feature may also be included to visualize how the value of particular objects has fluctuated over time, complete with indicators for significant spikes or drops in pricing. A recommendation engine is employed, wherein users can propose or dispute the inclusion of related objects to the subject's monetary value sub-score. Recommendations may be submitted to a system administrator or processed by a machine learning algorithm for verification and inclusion or exclusion from the database. The historocity module is also extended to cover digital objects, including those natively created in digital platforms such as games, online galleries or marketplaces, social media, or other creative publishing platforms. Even segments of binary or computer-programmed language or entire computer programs can be subjects of Historicity analysis. The system is adapted to treat individual moments as unique objects, enhancing the richness of storytelling mechanisms. These moments can be generated from memories or events that are captured, recorded, and created in real-time. A feature is incorporated for the perpetual personification of moments or subjects, granting them a form of "life" and facilitating their "humanization" over time. This personification could be a function of continuous data gathering and interpretation, contributing to a dynamic and evolving combined historocity score. To provide a more comprehensive understanding of the moments and memories, the Historocity Module integrates with an object+ system that allows for the creation of multiple forms of rich media and textual expressions, including audio-visual presentations, articles, virtual exhibits, or other media that offer in-depth examinations or expressions of the moments or subjects.

Figure 9:
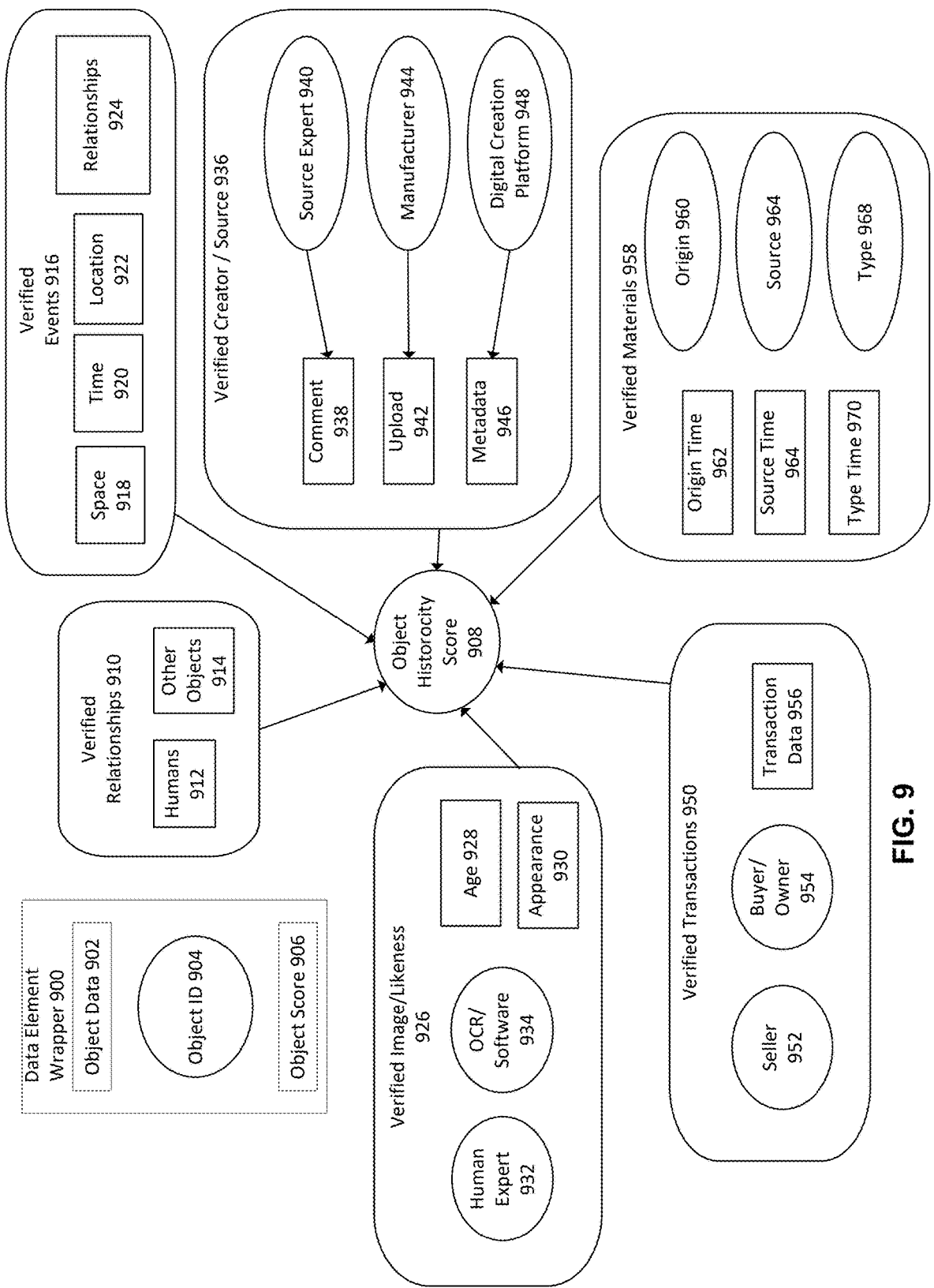
FIG. 9 illustrates an example of a system for calculating historicity of an individual object.

FIG. 9 illustrates a system for calculating the historocity score of an individual data element, which incorporates a variety of data elements and types that may contribute to this historocity score. Central to the system is the object historocity score 908, which aggregates and quantifies the history and significance of an object through an array of data attributes. The system comprises the data element wrapper 900, which is a file wrapper designed to encapsulate all pertinent object data and scores associated with a designated data element. Within this wrapper, the object data 902 refers to specific data attributes tied to a singular data element or specific collection of data elements. For instance, a vintage car's object data 902 might include its make, model, year, and color. The globally unique identifier 904 of an object is the identifier of the primary object that represents the object in relationship to its data attributes and associated scores, serving as a central reference, which can be represented as an SIO Code in the SIO system, or any other method or system of uniquely identifying objects in a system on the first system 102. Embedded within this object is the object score 906, which denotes the scores associated with the globally unique identifier 904. The object score 906 for an object may be, for example, a historocity score of the object. The object historocity score 908 is a representation of the object score 906, incorporating various data attributes to arrive at a comprehensive assessment of the object's history. For example, a first edition book might accrue points based on its publication date, rarity, condition, notable owners, verified experts who appraised it, transaction value over time, material construction, images or likenesses of the book, etc. Verified relationships 910 delineate the affiliations a data element has to humans and other objects. Humans 912 might refer to previous owners or individuals linked to the object, such as an artist for an artwork. Other objects 914 implies a connection with other entities, such as a component of a larger machine or a sequel to a primary item.

A verified event 916 can significantly influence the historocity score. This entails events where the object was involved or present. The space 918 represents coordinates linked to an event, e.g., the latitude and longitude of a historical battle. Time 920 denotes the specific temporal moment of the event. Location 922 offers a broader context, including geographical or political parameters. For instance, a dagger might be from the Mughal Empire era in India. Relationships 924 highlight the associations the event has with other entities, such as a painting being part of an influential exhibition. Verified image or likeness 926 entails representations of the data element. An age 928 might specify the temporal domain of a photograph, pinning it to a particular era like the Victorian Age. Appearance 930 details visual elements or provides an analytical breakdown of the image/likeness. A human expert 932 is an identifier for a specialist who has authenticated or verified the image/likeness, while OCR and/or Software 934 denotes a software module that may be used in combination with, or in lieu of, a human expert 932 to aid in this process.

The verified creator and/or ssource 936 details the provenance or origin of an object. For instance, a comment 938 can be a note from a source expert 940 verifying a manuscript's authenticity. Upload 942 contains information uploaded by the manufacturer 944, detailing aspects like a sculpture's creation process, such as bronze casting. Metadata 946, generated by the digital creation platform 948, might contain device-specific details and/or software specific details, such as the camera model that captured an image, a software program used to edit the image, the social media platform where the image was first uploaded, etc. Verified transaction 950 catalogues the commercial aspects of the object. Seller 952 and buyer and/or owner 954 respectively store data about the parties involved in the transaction, while Transaction Data 956 delves into specifics like sale price or auction bids.

Finally, verified materials 958 provides an insight into the materials related to the data element. The origin 960 might reveal a material's extraction point, such as an African mine for a diamond. Origin time 962 and source time 966 timestamp the timeline of material acquisition and delivery. Source 964 clarifies the supplier or entity providing the material. Type 968 categorizes the material, like specifying an artwork's medium, and type time 970 contextualizes the material's age, such as the period a particular wood was harvested for a vintage instrument. It should be noted that each verification endpoint can correspond to a singular instance or span the entire timeline of an object's existence. Importantly, the verifications interrelate, influencing each other either positively or negatively, especially in the absence of certain verification data. For instance, if a direct link to the object's creator or origin is unavailable, but the object's age, appearance, and materials align with known specifications of a specific manufacturer, artist, or writer, a probabilistic score can be assigned to the verified creator and/or source category. The proposed system necessitates varied scoring metrics, as the overall historocity score is derived from the cumulative count of verifiable attributes claimed by the user. As an exemplification, consider a baseball purportedly utilized in an MLB game. A unique identifier on the baseball, assigned by the MLB, would substantiate its origin as a Rawlings baseball from a designated game. However, discrepancies may arise, such as conflicting game details. In such scenarios, the object's possessor must either corroborate the updated history or challenge it, possibly with supporting evidence or a formal declaration. For this use case, the pinnacle score stands at 400. However, integrating additional verification parameters, such as image likeness, elevates the requisite perfect score to 500. Furthermore, during the object upload phase, the system can prompt users to specify any distinct markers on the object that can corroborate its uniqueness and affirm its provenance.

Figure 10:
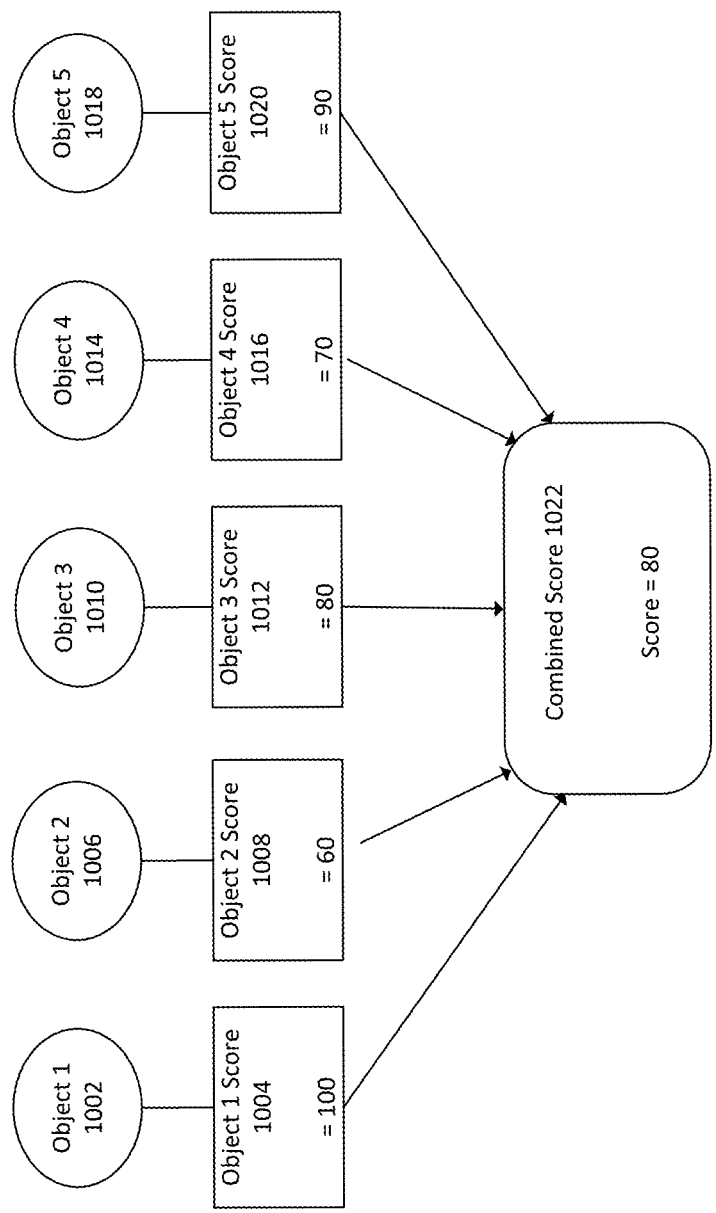
FIG. 10 illustrates an example of a collection of objects that, when considered collectively by a scoring system, yield a combined score.

FIG. 10 illustrates an example of a collection of objects that, when considered collectively by a scoring system, yield a combined score. This diagram portrays multiple objects, each possessing an individual historocity score. The amalgamation of these individual scores computes a unified historocity score for the entire collection. Object1 1002 represents a first object within this collection. In an illustrative example, the first object is the "home run" ball hit by Roberto Clemente, and further signed with his autograph. Such a distinction carries weight, and as a testament to its importance, Object1 Score 1004 reflects a historocity score of 100, underscoring its significance in the collection. Object2 1006 is the second object of this collection. This object is a "single" baseball, one that was hit by Roberto Clemente. The imprints of time and the story it tells are reflected in the Object2 Score 1008, which stands at a historocity score of 60. Next, Object3 1010, the third object in this collection is shown. Capturing another highlight in Roberto Clemente's career, this is the "triple" ball he hit. The historocity value it embodies are quantified in the Object3 Score 1012, which amounts to a historocity score of 80. The collection continues with Object4 1014, the fourth object in this curated collection. This object is a "double" ball, hit by Roberto Clemente. Validating its place in history, Object4 Score 1016 assigns it a historocity score of 70. Object5 1018, the fifth object, shares a resemblance with the first—it is a "single" ball hit by Roberto Clemente. However, adding to its value, this ball is graced with Roberto Clemente's signature, augmenting its value and historical weight. Object Score 1020 allocates it a historocity score of 90 to mark the notable value increase from having a signed ball, even if the play the ball was involved in may not have been as remarkable as, say, the "triple ball" hit represented by Object3 1010. The combined score 1022 amalgamates the individual scores from each object to represent the collection's overall historical worth. Whether derived through mean averages or potentially weighted calculations, or other methods or means, this score embodies the combined historical essence of the collection. In the given example, the combined score 1022 is determined to be 80, providing a holistic view of the collection's embedded history of 5 balls hit by Roberto Clemente with various historocity scores. In some examples, the combined score 1022 can be referred to as a combined historocity score, for instance if one or more of the sub-scores that are combined to form the combined score 1022 is a historocity score.

Figure 11:
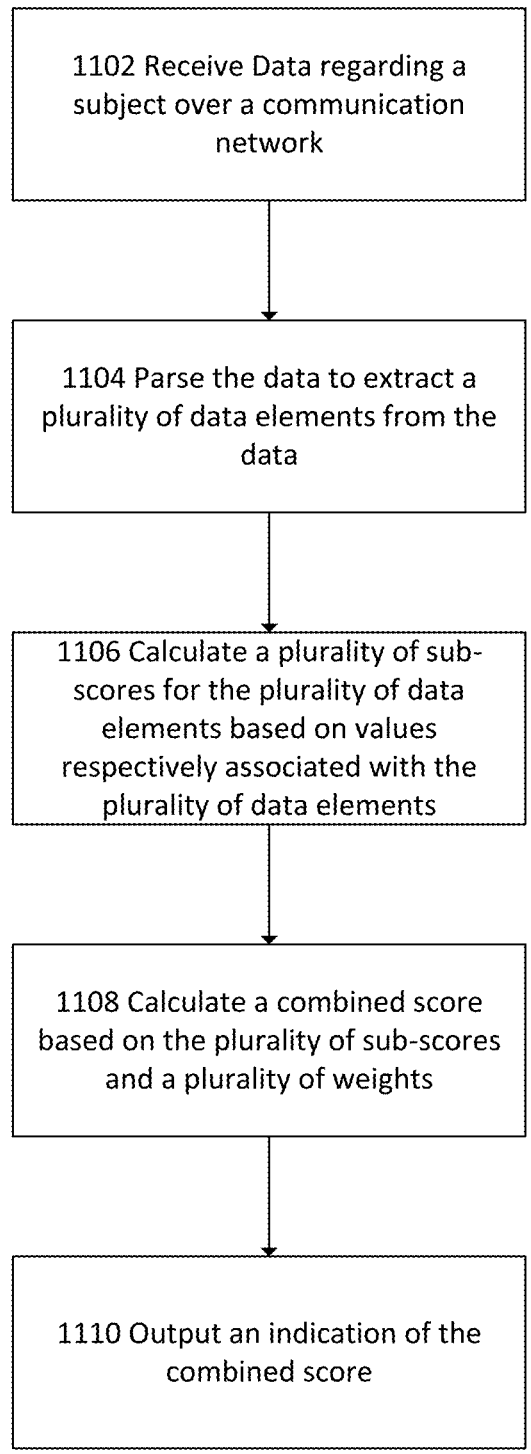
FIG. 11 is a flowchart illustrating an example of a process for score-based analysis.

FIG. 11 is a flowchart illustrating an example of a process for score-based analysis. The process is performed using an analysis system, which may include, for instance, the first system 102, the server system 112, the second system 130, the user device 138, system(s) that perform any of the process(es) illustrated in the flowcharts of FIGS. 2-8, the system of FIG. 9, the scoring system of FIG. 10, a computing system and/or computing device with at least one processor performing instructions stored in at least one memory (and/or in a non-transitory computer-readable storage medium), a system, and apparatus, or a combination thereof.

At operation 1102, the analysis system receives data regarding a subject over a communication network. The subject may be an object, a person, an event, a location or area, or a combination thereof. The data may include quantitative data and/or qualitative data. At operation 1104, the analysis system parses the data to extract a plurality of data elements from the data. The plurality of data elements may be associated with a plurality of aspects of the subject. In some examples, the data elements can be associated with an object, a person, an event, a location or area, or a combination thereof.

In some examples, the analysis system stores and/or maintains the plurality of data elements in a distributed ledger (e.g., blockchain ledger), at least one database (e.g., the databases of the first system 102), or a combination thereof.

At operation 1106, the analysis system calculates a plurality of sub-scores for the plurality of data elements based on values respectively associated with the plurality of data elements. The sub-scores may include historicity sub-scores, social value sub-scores, relational value sub-scores, other types of sub-scores discussed herein, or a combination thereof. In some examples, determining one of the sub-scores is based on at least one of a composition of an object associated with the subject or a manufacturer of the object associated with the subject. In an illustrative example, the data received in operation 1102 may include a list of soldiers who participated in the D-Day landing in Omaha Beach in Normandy, France, on Jun. 6, 1944. The data is parsed, at operation 1104, to extract a plurality of data elements, such as the event (e.g., the D-Day landing), a person who is a focus or whose perspective is important (e.g., a soldier named John smith), the location (e.g., Omaha Beach), other objects (e.g., weapons used in the battle), conditions (e.g., weather conditions), related media (e.g., movies, books), and the like. In some examples, the values that are associated with the data elements and that are used in the calculation(s) of operation 1106 can include social media interactions associated with the data elements (e.g., likes, shares), amount of media (within the received data) that references the data element (e.g., amount of articles, books, images, videos, and/or audio), a metric of popularity of a data element, a metric of importance of a data element, a metric of trustworthiness and/or confidence associated with a data element, or a combination thereof.

At operation 1108, the analysis system calculates a combined score based on the plurality of sub-scores and a plurality of weights corresponding to the plurality of sub-scores. The combined score 1022 of FIG. 10 is one example of the combined score of operation 1108. The plurality of weights may be based on respective levels of trust (and/or respective importance levels) associated with the sub-scores. For instance, sub-scores that have higher levels of trust or confidence or importance have higher weights, while sub-scores that have lower levels of trust or confidence or importance have lower weights. The combined score 1022 can be, can include, and/or can be based on, a weighted sum, a weighted average, and/or another weighted combination.

At operation 1110, the analysis system outputs an indication of the combined score in association with the subject. In some examples, the indication may include ranking a plurality of subjects based on the respective scores associated with the plurality of subjects, for instance with the combined score (calculated in operation 1108) being one of the respective scores. In some examples, the indication may include filtering of a plurality of subjects based on the respective scores associated with the plurality of subjects. In some examples, the indication may include providing a search result (responsive to a query) based on the respective scores associated with a plurality of subjects. In some examples, the indication may include a story generated to include subject(s) and/or data element(s) whose respective score(s) (e.g., operations 1106-1108) exceed a score threshold.

In some examples, the analysis system receives perspective data from a user device. The perspective data is associated with at least one person. The analysis system filters the plurality of data elements based on the perspective data to produce a filtered set of data elements that are specific to a perspective of at least one person. For instance, the analysis system can filter the data elements based to limit the data elements to those that are relevant to a perspective of an individual person, or a team or group of people. In some examples, the analysis system can display the filtered set of data elements according to a predetermined arrangement.

In some examples, the analysis system receives additional data regarding the subject over the communication network and updates the combined score based on the additional data. For instance, if the subject is an ongoing event, more data about the event can be received dynamically as the event continues to unfold, and new data elements can be extracted from the additional data. In some examples, the analysis system can update the combined score based on an amount of time elapsed since the calculation of the combined score.

In some examples, the analysis system receives a query (e.g., via user interface) inquiring as to whether a particular data element is true or correct, and/or if the data element aligns with and/or matches with other a particular story (e.g., timeline, set of data elements). The analysis system can answer the query by answering whether the particular data element is true or correct, and/or if the data element aligns and/or matches with other the particular story (e.g., timeline, set of data elements), for instance using the object corroboration module 148 and/or the story verification module 150. In an illustrative example, the analysis system can take into account scores, sub-scores, timelines, and/or trust scores associated with user(s) associated with a particular data element (e.g., a user who submitted a particular data element) in answering the query. For instance, if a data element is submitted by a user with a low trust level, the analysis system can identify that the data element is likely to be untrue or if the trust level of the user is low based on limited information, the trust score of the user is incomplete or limited. In another illustrative example, the analysis system can identify that a particular object (e.g., associated with a specific data element) is untrue and doesn't align with a story or timeline because the object could not have been present at a specific historical event because that object hadn't been invented yet, or that a particular person couldn't have been present at a specific historical event because that person was known to be at a different location at the same time, and the like.

Figure 12:
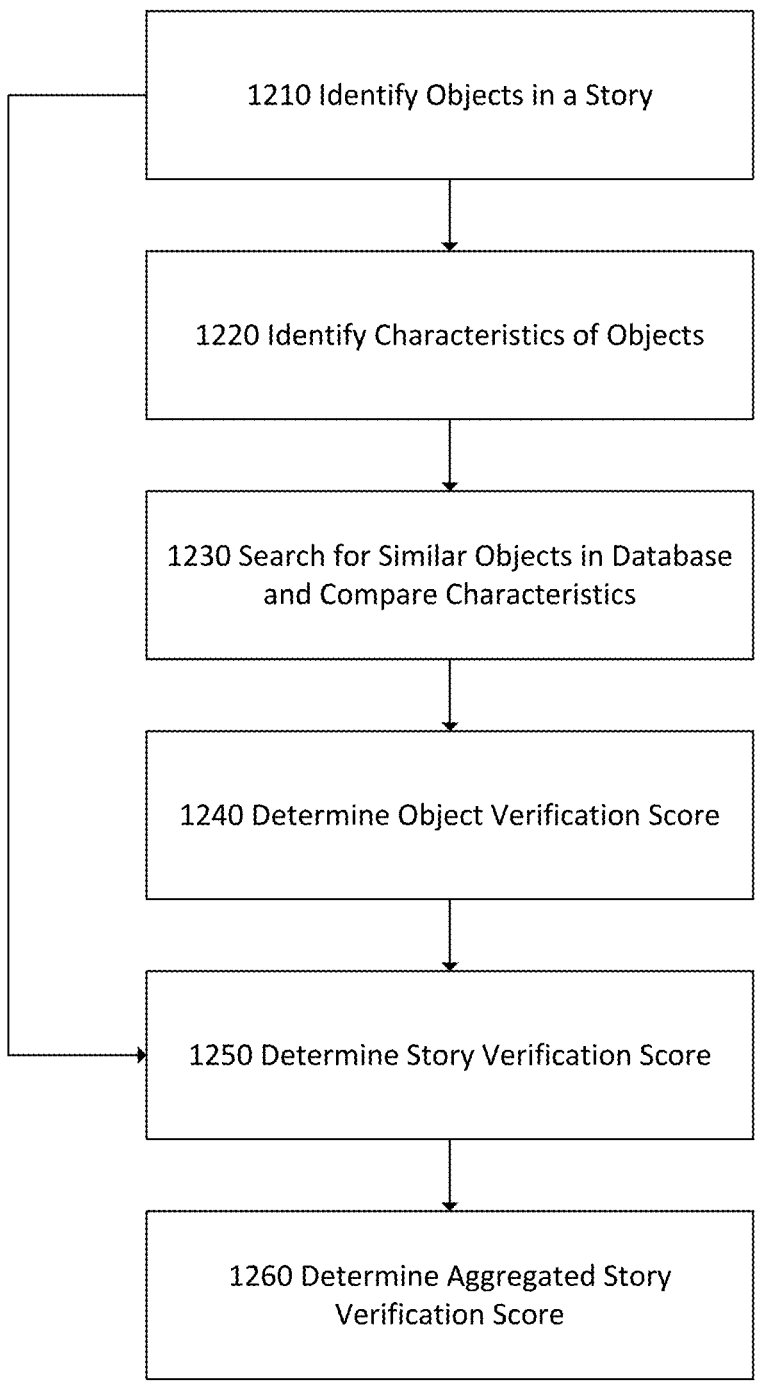
FIG. 12 is a flow diagram illustrating an exemplary function of an object corroboration module and a story verification module.

FIG. 12 is a flow diagram illustrating an exemplary function of an object corroboration module and a story verification module. The process begins with operation 1210, with the story verification module 150 identifying one or more objects comprising a story. In an embodiment, the story may include a description of a watch that is passed down to the attributed source, John Smith, from his grandfather, James Smith. Each identified object may be associated with an object verification score. If so, the story verification module may skip to operation 1250.

If no object verification score is associated with the object, the object corroboration module 148 identifies at least one characteristic of the current object. A characteristic may be any descriptive feature such as material, color, dimensions, function, etc. For example, a watch may have a glass face, a stainless-steel housing, and further have an adjustable stainless-steel wrist band. The watch may further comprise an hour hand, a minute hand, and a second hand, and may further have a Rolex logo on the watch face and engraved in the back of the watch housing. The watch casing may have a diameter of 1.75 inches and numerical hour marks on the watch face in roman numerals. At operation 1230, the object corroboration module searches the subject database 110 for objects which are similar to the current object that share similar characteristics as the current object. For example, the subject database 110 may include a plurality of descriptions of Rolex watches, or stainless-steel watches. The object corroboration module 148 may select a similar object from the identified object characteristics, such as a watch comprising a stainless-steel adjustable watch band. The object corroboration module 148 may compare the characteristics of the current object and the similar object found in the subject database 110 to determine whether the data from the subject database 110 corroborates the selected object characteristic. For example, the database data corroborates the description of the object characteristic if the object described in the object subject database 110 also has an expandable stainless-steel watch band. In some embodiments, an object may not have information which corroborates or refutes the veracity of the object characteristic. For example, the description of the watch from the subject database 110 may not mention the watch band or the material the watch band is made of. Similarly, the database data may be incomplete, such as describing the watch band as being made of stainless-steel, however not including a description of the watch band as being adjustable. In some embodiments, the adjustable feature may be a separate object characteristic which may be evaluated separately from the material of the watch band. The database data may refute the object characteristic if the database data described a watch band made of leather.

At operation 1240, the object verification score may be determined based upon the comparison between the object characteristic and the corresponding database data and the determination of whether the database data corroborates the description of the object characteristic. The object corroboration module 148 may assign a default object verification score for the current object and adjust the object verification score based on the corroborating description from similar objects. In an embodiment, the object verification score may be increased by a factor of number of corroborating descriptions or the number of similar objects with a corroborating description. In the event the database data corroborates at least part of the current object characteristic, such as a stainless-steel Rolex watch having an adjustable watch band, then the object verification score may be increased. Alternatively, if the database data refutes at least part of the current object characteristic, such as a stainless-steel Rolex watch having a leather watch band, then the object verification score may be decreased. In some embodiments, the database data may neither corroborate nor refute the object characteristics, in which case the object verification score may remain unchanged. Similarly, database data may partially corroborate and partially refute an object characteristic, in which case there may be no change to the object verification score, or alternatively, each element may be weighted differently and result in a net increase or a net decrease of the object verification score. The object verification score may be qualitative, such as true or false. This determination may be based upon exceeding a quantitative threshold value. The object verification score may be adjusted via increments, such as increasing or decreasing an object verification score by 1. Alternatively, the score may be increased by 5, and may further be weighted based upon, for example, a source quality score of the source to which the database data object is attributed. For example, a base increase for corroborating increase may be 5, however the source quality score for the attributed source is 193, therefore a weighting of 1.93 is applied resulting in an increase of 9.65. Alternatively, an algorithm may be used to determine the object verification score which may include machine learning and/or artificial intelligence. In some embodiments, an object verification score adjustment may be weighted by the resolution of corroborating data. For example, an object characteristic which is corroborated by a more detailed description would be increased by an amount greater than the same object characteristic which is corroborated by a more general description. The object verification score may be further adjusted based on comparison to another similar object sharing a characteristic or based on comparison between another characteristic. The process of adjusting the object verification score may continue until there are no more characteristics to compare or there are no more similar objects.

At operation 1250, the story verification module may determine the story verification score based on the object verification score of the object comprising the story or the source score. For example, an object may be assigned an story verification score of 105 if the object has an object verification score of 105. A default story verification score may be provided to be adjusted by a first object verification score. In an embodiment, the default story verification score may be the same for every story. In an alternate embodiment, the default story verification score may be based upon the source's source score. In an embodiment, the starting story verification score is equal to the source's source score. The story verification score may be adjusted incrementally, increasing by a set value for each object verification score about a threshold value and negative by a set value for each object verification score below a threshold value. In such an embodiment, there may be a range between which the story verification score is not changed. In alternate embodiments, the story verification score is adjusted according to an algorithm which may utilize machine learning or an artificial intelligence. In some embodiments, the story verification score may be adjusted by a margin based upon the object verification score. For example, 100 may be a neutral score, which would result in no change to the story verification score. The story verification score may be increased or decreased by the difference between the object verification score and the neutral score. The story verification module 150 may retrieve data from source database 104 for a source score assigned to the source of the story. In an embodiment, the source is John Smith who has a source quality score of 102. The story verification score may be adjusted based upon the source quality score. The source score may be used as a weighted modifier, such as multiplying the story verification score by the source score as a percentage to determine the final story verification score. Other methods of adjusting the story verification score using a source score may be utilized such as an algorithm including machine learning and/or artificial intelligence. In some embodiments, a source score is not used to further adjust the story verification score.

At operation 1260, if there are more than one objects in a story, an aggregate story verification score may be determined. If there are more objects, the story verification module 150 may return to any of operations 1210, 1220, and/or 1250 to determine the story verification score for each of the objects. The story verification scores from the objects in the story may be aggregated to determine the aggregate story verification score.

Figure 13:
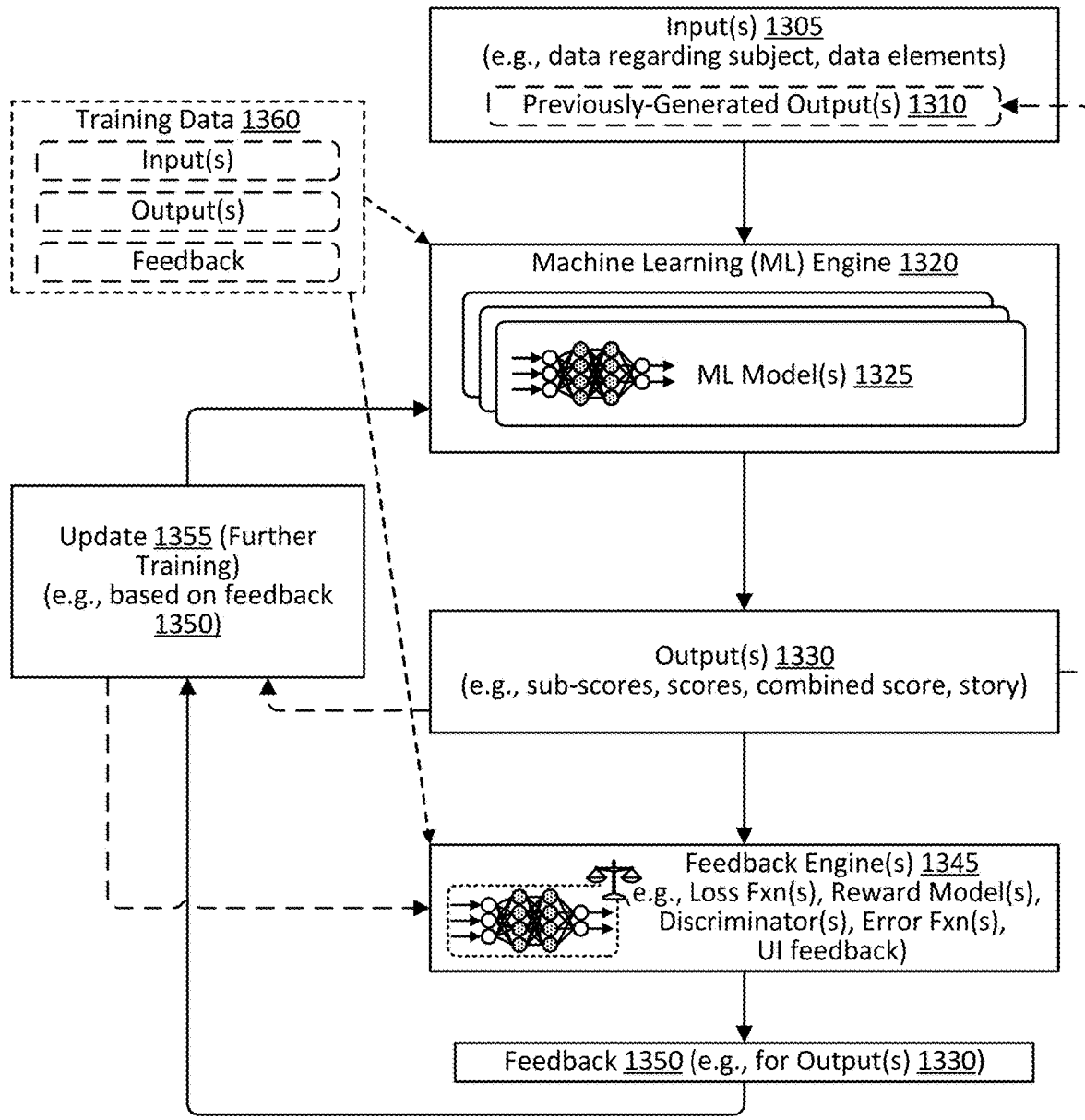
FIG. 13 is a block diagram illustrating an example of a machine learning system.

FIG. 13 is a block diagram illustrating an example of a machine learning system 1300 for training and use of one or more machine learning model(s) 1325 used to generate one or more outputs 1330. The machine learning system 1300 a machine learning (ML) engine 1320 that generates, trains, uses, and/or updates one or more ML model(s) 1325.

Within FIG. 13, a graphic representing the ML model(s) 1325 illustrates a set of circles connected to one another. Each of the circles can represent a node, a neuron, a perceptron, a layer, a portion thereof, or a combination thereof. The circles are arranged in columns. The leftmost column of white circles represent an input layer. The rightmost column of white circles represent an output layer. Two columns of shaded circled between the leftmost column of white circles and the rightmost column of white circles each represent hidden layers. An ML model can include more or fewer hidden layers than the two illustrated, but includes at least one hidden layer. In some examples, the layers and/or nodes represent interconnected filters, and information associated with the filters is shared among the different layers with each layer retaining information as the information is processed. The lines between nodes can represent node-to-node interconnections along which information is shared. The lines between nodes can also represent weights (e.g., numeric weights) between nodes, which can be tuned, updated, added, and/or removed as the ML model(s) 1325 are trained and/or updated. In some cases, certain nodes (e.g., nodes of a hidden layer) can transform the information of each input node by applying activation functions (e.g., filters) to this information, for instance applying convolutional functions, downscaling, upscaling, data transformation, and/or any other suitable functions.

In some examples, the ML model(s) 1325 can include a feed-forward network, in which case there are no feedback connections where outputs of the network are fed back into itself. In some cases, the ML model(s) 1325 can include a recurrent neural network, which can have loops that allow information to be carried across nodes while reading in input. In some cases, the network can include a convolutional neural network, which may not link every node in one layer to every other node in the next layer.

One or more input(s) 1305 can be provided to the ML model(s) 1325. The ML model(s) 1325 can be trained by the ML engine 1320 (e.g., based on training data 1360) to generate one or more output(s) 1330. In some examples, the input(s) 1305 may include data and/or data elements regarding a subject, an object, an event, a source, sensor data, geography data, and relevant values for determining scores and/or sub-scores (e.g., historocity sub-scores). For instance, the input(s) 1305 can include the data from operation 1102, the data elements from operation 1104, the sub-scores from operation 1106, and/or the combined score of operation 1108.

The output(s) 1330 generated by the ML model(s) 1325 in response to input of the input(s) 1305 into the ML model(s) 1325 can include a plurality of sub-scores, a combined score, an object verification score, source score, a story, a story verification score, or an aggregate story verification score. In some examples, the ML model(s) 1325 can process the data from operation 1102 (as input(s) 1305) to generate the data elements from operation 1104 (as output(s) 1330). In some examples, the ML model(s) 1325 can process the data elements from operation 1104 (as input(s) 1305) to generate at least one of the sub-scores of operation 1106 (as output(s) 1330). In some examples, the ML model(s) 1325 can process the sub-scores of operation 1106 (as input(s) 1305) to generate the combined score of operation 1108 (as output(s) 1330). In some examples, the ML model(s) 1325 can process the combined score of operation 1108 (as input(s) 1305) to generate the indication of operation 1110 (as output(s) 1330). In some examples, the sub-scores may be calculated (e.g., at operation 1106) using the trained ML model(s) 1325 that processes the values associated with the data elements (e.g., the values used in the calculations of operation 1106). In some examples, the trained ML model(s) 1325 can include one or more neural network(s) (NN(s)), convolutional NN(s((CNN(s)), time delay NN(s) (TDNN(s)), deep network(s), autoencoder(s), deep belief net(s) (DBN(s)), recurrent NN(s) (RNN(s)), generative adversarial networks (GAN(s)), conditional GAN(s) (cGANs), support vector machine(s) (SVM(s)), random forest(s) (RF(s)), deep learning system(s), classifier(s), transformer(s), large language model(s) (LLM(s)), or combinations thereof.

In some examples, the input(s) 1305 can include previously-generated output(s) 1310 (outputs 1330 generated by the ML model(s) 1325 in previous passes). In some examples, the ML system 1300 repeats the process illustrated in FIG. 13 multiple times to generate the output(s) 1330 in multiple passes, using some of the output(s) 1330 from earlier passes as some of the input(s) 1305 in later passes, for instance in the form of previously-generated output(s) 1310 in the input(s) 1305. For instance, in an illustrative example, in a first pass, the ML model(s) 1325 can process the data from operation 1102 (as input(s) 1305) to generate the data elements from operation 1104 (as output(s) 1330). In a second pass, the ML model(s) 1325 can process the data from operation 1102 (as input(s) 1305) and/or the data elements generated in the first pass (as the previously-generated output(s) 1310 of the input(s) 1305) to generate at least one of the sub-scores of operation 1106 (as output(s) 1330). In a third pass, the ML model(s) 1325 can process the data from operation 1102 (as input(s) 1305), the data elements generated in the first pass (as the previously-generated output(s) 1310 of the input(s) 1305), and/or the sub-scores generated in the second pass (as the previously-generated output(s) 1310 of the input(s) 1305) to generate the combined score of operation 1108 (as output(s) 1330). In a fourth pass, the ML model(s) 1325 can process the data from operation 1102 (as input(s) 1305), the data elements generated in the first pass (as the previously-generated output(s) 1310 of the input(s) 1305), the sub-scores generated in the second pass (as the previously-generated output(s) 1310 of the input(s) 1305), and/or the combined score generated in the third pass (as the previously-generated output(s) 1310 of the input(s) 1305) to generate the indication of operation 1110 (as output(s) 1330).

In some examples, the ML model(s) 1325 can process the data from operation 1102 (as input(s) 1305) to generate the data elements from operation 1104 (as output(s) 1330). In some examples, the ML model(s) 1325 can process the data elements from operation 1104 (as input(s) 1305) to generate at least one of the sub-scores of operation 1106 (as output(s) 1330). In some examples, the ML model(s) 1325 can process the sub-scores of operation 1106 (as input(s) 1305) to generate the combined score of operation 1108 (as output(s) 1330). In some examples, the ML model(s) 1325 can process the combined score of operation 1108 (as input(s) 1305) to generate the indication of operation 1110 (as output(s) 1330).

In some examples, the ML model(s) 1325 can also be used to generate answer(s) to queries associated with the object corroboration module 148 and/or the story verification module 150. For instance, the input(s) 1305 can include a query (e.g., received via user interface) inquiring as to whether a particular data element is true or correct, and/or if the data element aligns and/or matches with other a particular story (e.g., timeline, set of data elements). The ML model(s) 1325 can process this query, in some cases along with other type of input(s) 1305 discussed herein, to generate an answer to the query as one of the output(s) 1330. The answer can answer the query by answering whether the particular data element is true or correct, and/or if the data element aligns and/or matches with other the particular story (e.g., timeline, set of data elements). For instance, the answer can indicate an object verification score (as in operation 1240), a story verification score (as in operation 1250), and/or an aggregated story verification score (as in operation 1260).

In some embodiments, the ML system includes one or more feedback engine(s) 1345 that generate and/or provide feedback 1350 about the output(s) 1330. In some examples, the feedback engine(s) 1345 include loss function(s), reward model(s) (e.g., other ML model(s) that are used to score the output(s) 1330), discriminator(s), error function(s) (e.g., in back-propagation), user interface feedback received via a user interface from a user, or a combination thereof. For example, the trained ML model may be further trained based on feedback 1350 associated with the indication of the combined score, thereby updating the combined score to improve further determination(s) of further sub-score(s). The feedback may be included in a training data set for the further training of the trained ML model. In some examples, the feedback may include user feedback, feedback from another application or function that uses the combined score for a task (e.g., ranking, filtering, searching), feedback from another device, or a combination thereof. For instance, the feedback can include an indication of whether or not the combined score represents an accurate assessment of the subject, for instance based on an analysis received from a human reviewer, an analysis received from another computer-run model (e.g., another ML model), more data (e.g., additional data that is received after the operation 1110), or a combination thereof. In some examples, the feedback is positive, and the further training updates the trained ML model by strengthening weights within the ML model (e.g., neural network weights) that contributed to generating the sub-scores at operation 1106, to encourage the ML model to generate similar sub-scores given similar inputs. In some examples, the feedback is negative, and the further training updates the trained ML model by weakening or removing weights within the ML model that contributed to generating the sub-scores at operation 1106, to discourage the ML model from generating similar sub-scores given similar inputs.

The ML engine 1320 of the ML system can update (further train) the ML model(s) 1325 based on the feedback 1350 to perform an update 1355 (e.g., further training) of the ML model(s) 1325 based on the feedback 1350. In some examples, the feedback 1350 includes positive feedback, for instance indicating that the output(s) 1330 closely align with expected output(s) and/or that the output(s) 1330 serve their intended purpose. In some examples, the feedback 1350 includes negative feedback, for instance indicating a mismatch between the output(s) 1330 and the expected output(s), and/or that the output(s) 1330 do not serve their intended purpose. For instance, high amounts of loss and/or error (e.g., exceeding a threshold) can be interpreted as negative feedback, while low amounts of loss and/or error (e.g., less than a threshold) can be interpreted as positive feedback. Similarly, high amounts of alignment (e.g., exceeding a threshold) can be interpreted as positive feedback, while low amounts of alignment (e.g., less than a threshold) can be interpreted as negative feedback. In response to positive feedback in the feedback 1350, the ML engine 1320 can perform the update 1355 to update the ML model(s) 1325 to strengthen and/or reinforce weights associated with generation of the output(s) 1330 to encourage the ML engine 1320 to generate similar output(s) 1330 given similar input(s) 1305. In response to negative feedback in the feedback 1350, the ML engine 1320 can perform the update 1355 to update the ML model(s) 1325 to weaken and/or remove weights associated with generation of the output(s) 1330 to discourage the ML engine 1320 from generating similar output(s) 1330 given similar input(s) 1305.

In some examples, the ML engine 1320 can also perform an initial training of the ML model(s) 1325 before the ML model(s) 1325 are used to generate the output(s) 1330 based on the input(s) 1305. During the initial training, the ML engine 1320 can train the ML model(s) 1325 based on training data 1360. In some examples, the training data 1360 includes examples of input(s) (of any input types discussed with respect to the input(s) 1305), output(s) (of any output types discussed with respect to the output(s) 1330), and/or feedback (of any feedback types discussed with respect to the feedback 1350). In some cases, positive feedback in the training data 1360 can be used to perform positive training, to encourage the ML model(s) 1325 to generate output(s) similar to the output(s) in the training data given input of the corresponding input(s) in the training data. In some cases, negative feedback in the training data 1360 can be used to perform negative training, to discourage the ML model(s) 1325 from generate output(s) similar to the output(s) in the training data given input of the corresponding input(s) in the training data.

What is claimed is:

1. A method for score-based analysis, the method comprising:
    receiving data regarding a subject over a communication network;
    parsing the data to extract a plurality of data elements from the data, wherein the plurality of data elements is associated with a plurality of aspects of the subject;
    generating a plurality of sub-scores for the plurality of data elements based on values respectively associated with the plurality of data elements;
    calculating a combined score based on the plurality of sub-scores and a plurality of weights corresponding to the plurality of sub-scores, wherein the plurality of weights is based on respective levels of confidence in respective levels of accuracy associated with the plurality of sub-scores, and wherein the combined score is indicative of historical significance and is distinct from a monetary value; and
    outputting, through an interactive user interface, an indication of at least a subset of the plurality of data elements associated with the subject arranged according to a ranking associated with the combined score.

2. The method of claim 1, further comprising:
    aligning the plurality of data elements along a timeline to outline a story corresponding to the subject, wherein the indication is associated with the story.

3. The method of claim 1, further comprising outputting the plurality of data elements.

4. The method of claim 1, wherein the plurality of sub-scores include one or more object verification scores associated with one or more objects in a story based one or more comparison between one or more characteristics of the one or more objects and one or more reference characteristics of one or more reference objects.

5. The method of claim 4, wherein the plurality of sub scores include a story verification score of the story, wherein the story verification score is based on the one or more object verification scores.

6. The method of claim 1, wherein the subject is at least one of an object or a person.

7. The method of claim 1, wherein the subject is an event.

8. The method of claim 1, wherein outputting the indication includes ranking a plurality of subjects based on respective scores associated with the plurality of subjects.

9. The method of claim 1, wherein the plurality of sub-scores includes at least one of a historocity sub-score or a monetary value sub-score.

10. The method of claim 1, wherein the data includes quantitative data and qualitative data related to the subject.

11. The method of claim 1, further comprising maintaining at least a subset of the plurality of data elements in a distributed ledger.

12. The method of claim 1, further comprising storing at least a subset of the plurality of data elements in at least one database.

13. The method of claim 1, wherein calculating the combined score includes calculating a weighted sum based on the plurality of sub-scores and the plurality of weights.

14. The method of claim 1, wherein calculating the combined score includes calculating a weighted average based on the plurality of sub-scores and the plurality of weights.

15. The method of claim 1, wherein the plurality of sub-scores includes a sub-score that is based on at least one of a composition of an object associated with the subject or a manufacturer of the object associated.

16. The method of claim 1, wherein the plurality of sub-scores includes a social value sub-score that is based on a number of instances of online social interactions associated with the subject.

17. The method of claim 1, wherein the plurality of sub-scores includes a relational value sub-score that is based on entities and events associated with the subject.

18. The method of claim 1, further comprising:
    receiving perspective data from a user device, wherein the perspective data is associated with at least one person; and
    filtering the plurality of data elements based on the perspective data to produce a filtered set of data elements that are specific to a perspective of the at least one person, wherein the indication that is output through the interactive user interface is based on the filtered set of data elements.

19. The method of claim 18, further comprising displaying the filtered set of data elements through the interactive user interface according to a predetermined arrangement.

20. The method of claim 1, further comprising:
receiving additional data regarding the subject over the communication network;
updating the combined score based on the additional data to generate an updated combined score; and
updating the interactive user interface based on the updated combined score.

21. The method of claim 1, further comprising:
updating the combined score to generate an updated combined score in response to at least a predetermined amount of time having elapsed since the calculation of the combined score; and
updating the interactive user interface based on the updated combined score.

22. The method of claim 1, wherein generating the plurality of sub-scores includes processing the values respectively associated with the plurality of data elements using a trained machine learning model that generates at least one of the plurality of sub-scores.

23. The method of claim 22, wherein at least a subset of the respective levels of confidence are based on the trained machine learning model.

24. The method of claim 22, further comprising updating the trained machine learning model based on feedback associated with the indication.

25. A system for score-based analysis, the system comprising:
a memory that stores instructions; and
a processor, wherein execution of the instructions by the processor causes the processor to:
receive data regarding a subject over a communication network;
parse the data to extract a plurality of data elements from the data, wherein the plurality of data elements is associated with a plurality of aspects of the subject;
generate a plurality of sub-scores for the plurality of data elements based on values respectively associated with the plurality of data elements;
calculate a combined score based on the plurality of sub-scores and a plurality of weights corresponding to the plurality of sub-scores, wherein the plurality of weights is based on respective levels of confidence in respective levels of accuracy associated with the plurality of sub-scores, and wherein the combined score is indicative of historical significance and is distinct from a monetary value; and
output, through an interactive user interface, an indication of at least a subset of the plurality of data elements associated with the subject arranged according to a ranking associated with the combined score.

26. A non-transitory computer-readable storage medium, having embodied thereon a program executable by a processor to perform a method for score-based analysis, the method comprising:
receiving data regarding a subject over a communication network;
parsing the data to extract a plurality of data elements from the data, wherein the plurality of data elements is associated with a plurality of aspects of the subject;
generating a plurality of sub-scores for the plurality of data elements based on values respectively associated with the plurality of data elements;
calculating a combined score based on the plurality of sub-scores and a plurality of weights corresponding to the plurality of sub-scores, wherein the plurality of weights is based on respective levels of confidence in respective levels of accuracy associated with the plurality of sub-scores, and wherein the combined score is indicative of historical significance and is distinct from a monetary value; and
outputting, through an interactive user interface, an indication of at least a subset of the plurality of data elements associated with the subject arranged according to a ranking associated with the combined score.

* * * * *